United States Patent
Goto et al.

(10) Patent No.: US 8,370,277 B2
(45) Date of Patent: Feb. 5, 2013

(54) MUSICAL PIECE RECOMMENDATION SYSTEM AND METHOD

(75) Inventors: Masataka Goto, Ibaraki (JP); Kazuyoshi Yoshii, Ibaraki (JP); Hiroshi Okuno, Kyoto (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 186 days.

(21) Appl. No.: 12/671,255

(22) PCT Filed: Jul. 31, 2008

(86) PCT No.: PCT/JP2008/063771
§ 371 (c)(1),
(2), (4) Date: Jun. 28, 2010

(87) PCT Pub. No.: WO2009/017195
PCT Pub. Date: Feb. 5, 2009

(65) Prior Publication Data
US 2011/0112994 A1    May 12, 2011

(30) Foreign Application Priority Data
Jul. 31, 2007    (JP) ................................. 2007-199936

(51) Int. Cl.
G06F 15/18    (2006.01)
(52) U.S. Cl. ......................................................... 706/12
(58) Field of Classification Search ................ 369/30.09
See application file for complete search history.

(56) References Cited

U.S. PATENT DOCUMENTS

| 5,583,763 A * | 12/1996 | Atcheson et al. | 707/750 |
| 5,616,876 A * | 4/1997 | Cluts | 84/609 |
| 6,539,395 B1 * | 3/2003 | Gjerdingen et al. | 1/1 |
| 2006/0083119 A1 * | 4/2006 | Hayes | 369/30.09 |

OTHER PUBLICATIONS

'An efficient hybrid music recommender system using an incrementally trainable probabilistic generative model': Yoshii, 2008, IEEE, 1558-7916, pp. 435-447.*
Lovatt. StreamMan—Music beyond the iPod [online], [retrieved on Feb. 12, 2012]. Retrieved fiom the Internet <http://digital-lifestyles.info/2004/10/18/streamman-music-beyond-the-ipod/>.*
'Instance Selection Techniques for Memory Based Colliaborative Filtering': Yu, 2002, Proc, second SIAM International Conference on Data Mining (SDM'02), pp. 59-74.*

(Continued)

*Primary Examiner* — Kakali Chaki
*Assistant Examiner* — Peter Coughlan
(74) *Attorney, Agent, or Firm* — Rankin, Hill & Clark LLP

(57) ABSTRACT

A musical piece recommendation system that allows instantaneous registration of a new user and a new musical piece without retraining in a basic training section. A first incremental training section monitors a rating history storage section, and each time a change is made to a rating history or a new user is added, performs updating of or addition of the topic selection probability for the user for which the change is made to the rating history or for the new user such that the likelihood determined by a basic training section is kept maximized. A second incremental training section monitors an acoustic feature storage section, and each time a new musical piece is added to perform addition to acoustic features, adds the musical piece selection probability related to the added musical piece such that the likelihood determined by the basic training section is kept maximized.

10 Claims, 17 Drawing Sheets

OTHER PUBLICATIONS

'Hybrid Collaborative and Content based Music Recommendations Using Probabilistic Model with Latent User Preferences': Yoshii, 2006, Proceedings of the 7th international conference on Music information retrieval (ISMIR).*

Kazuyoshi Yoshii et al., "A Hybrid Music Recommender System Based on Probabilistic Integration of User Ratings and Acoustic Features", Information Processing Society of Japan Research Report, Aug. 7, 2006, vol. 2006, No. 90, pp. 45-52.

Alexandrin Popescul and Lyle H. Ungar, "Probabilistic Models for Unified Collaborative and Content-Based Recommendation in Sparse-Data Environments", Proceedings of the Seventeenth Conference on Uncertainty in Artificial Intelligence (UAI-2001), pp. 437-444.

Naonori Ueda and Ryohei Nakano, "Deterministic Annealing EM Algorithm" Neural Networks vol. 11, No. 2 pp. 271, 282, 1998.

Lian Zhang, et al., "An Efficient Solution to Factor Drifting Problem in the pLSA Model", CIT 2005, pp. 175-181.

K. Yoshii et al., "Hybrid Collaborative and Content-based Music Recommendation Using Probabilistic Model with Latent User Preferences", ISMIR, 2006, pp. 296-301.

* cited by examiner

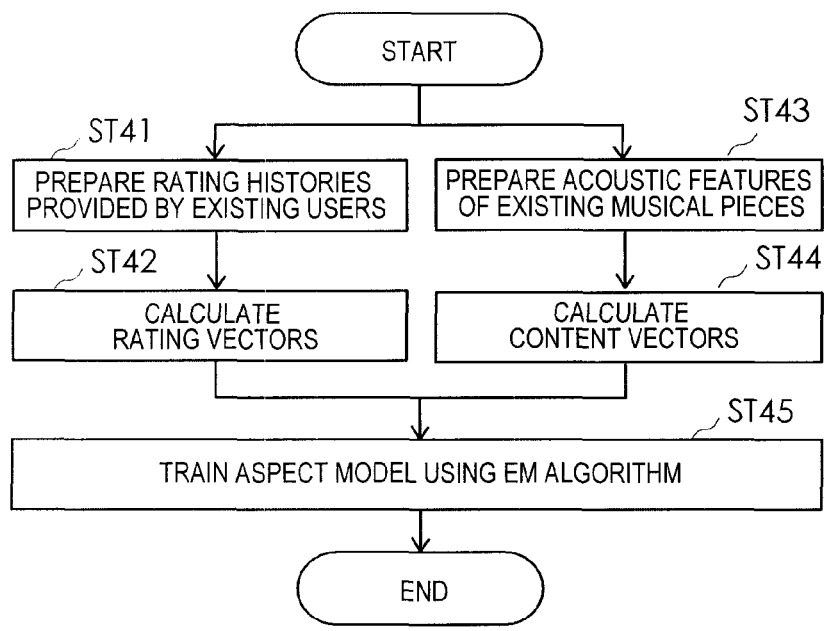
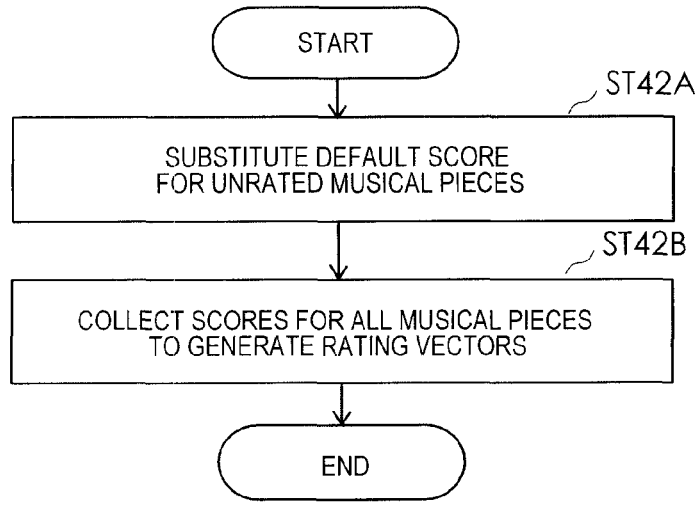

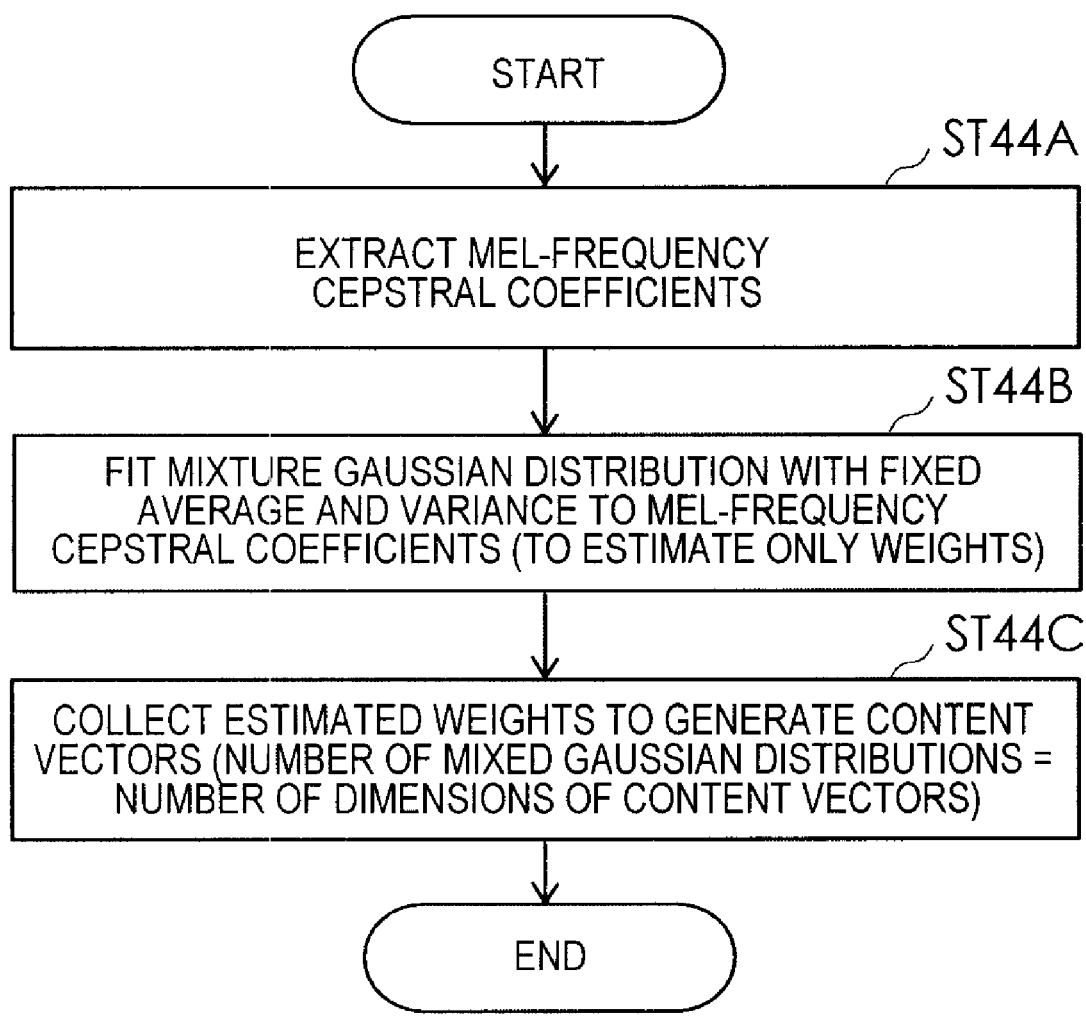

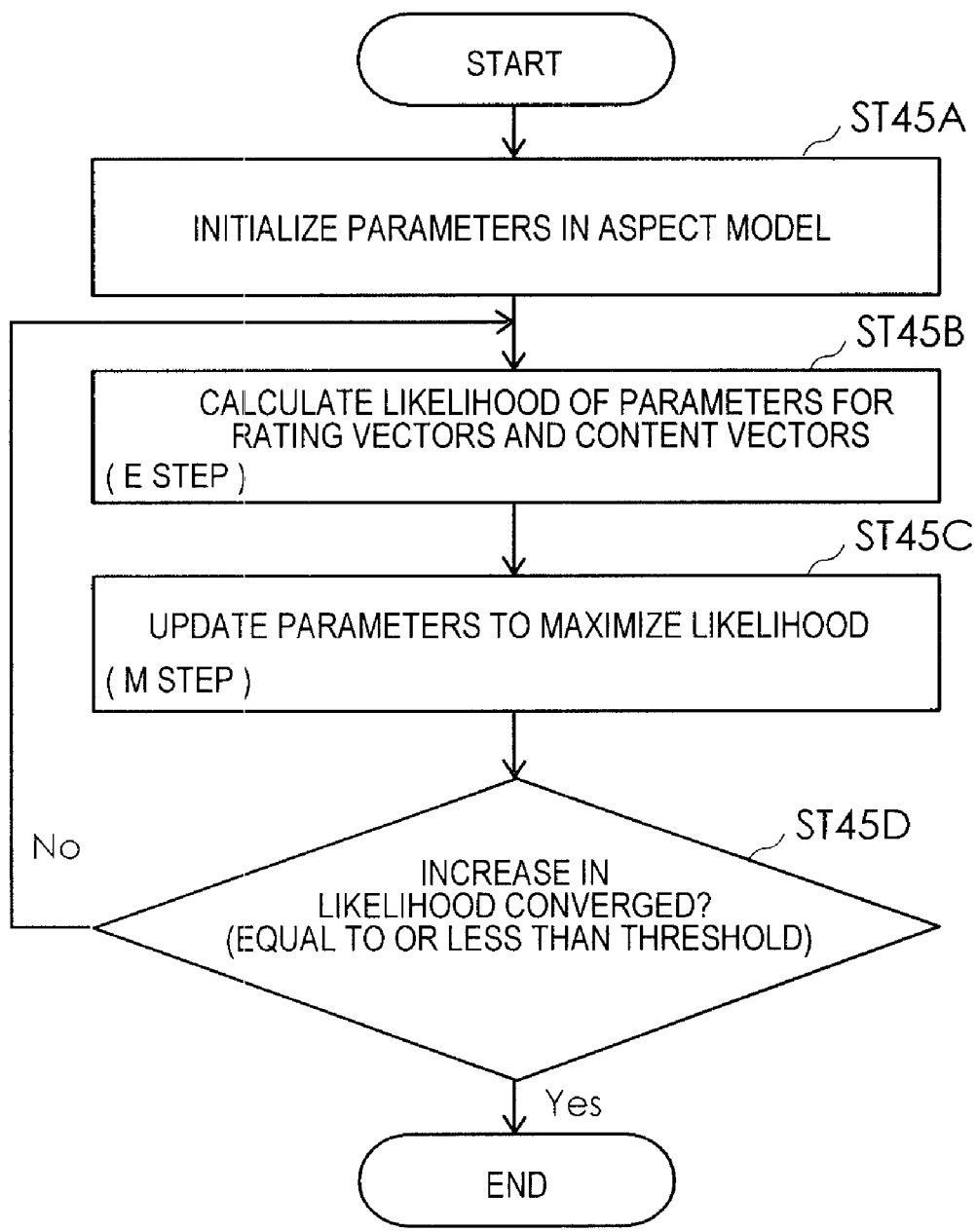

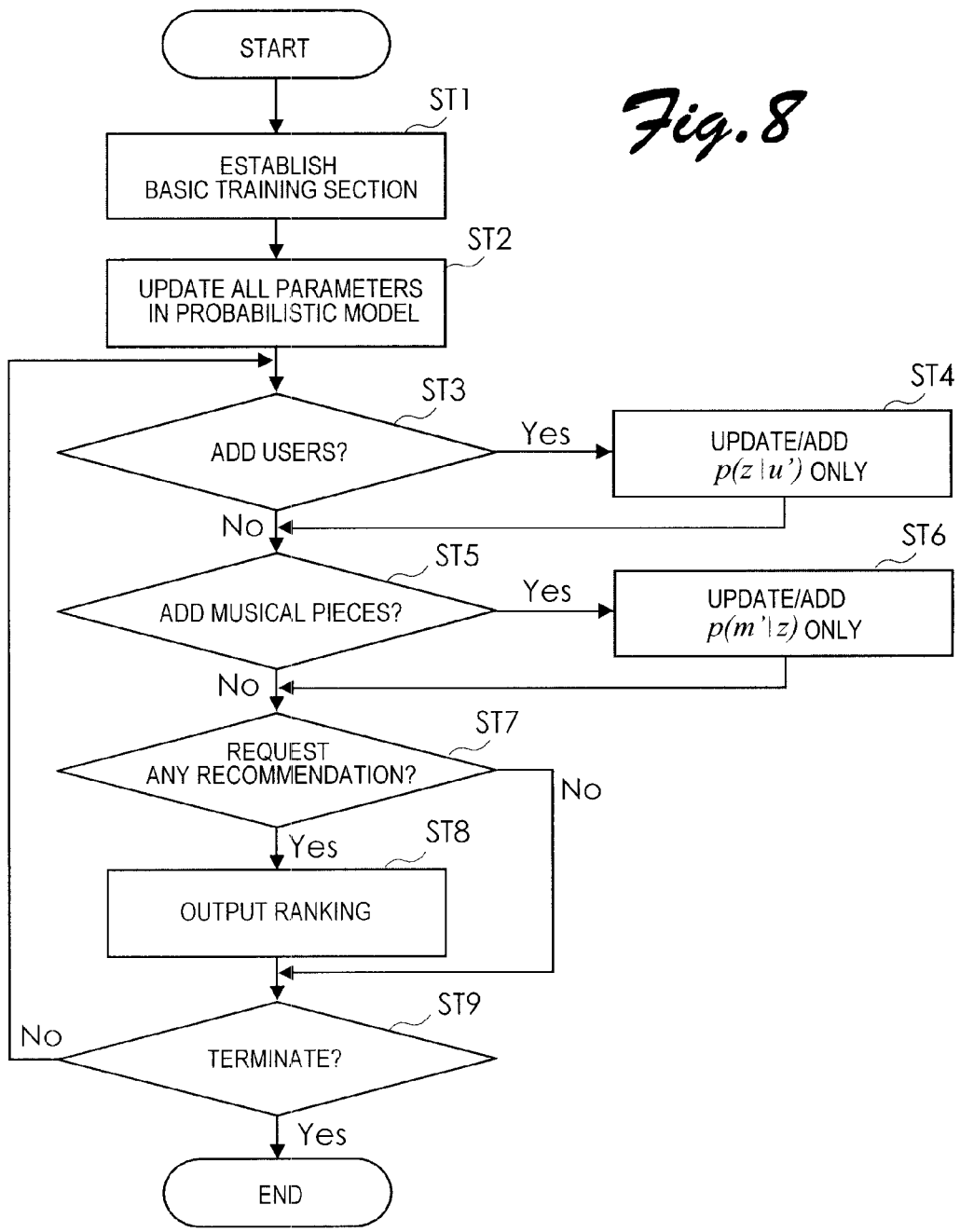

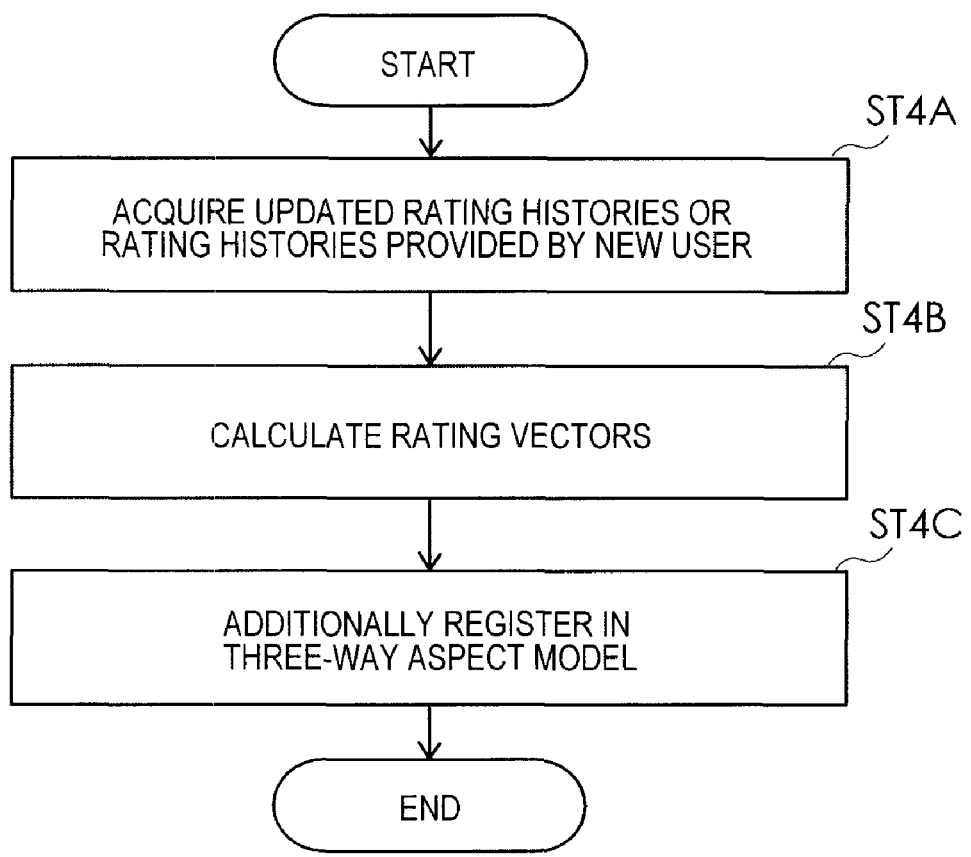

*Fig. 13*

|  | | GROUP 1 | GROUP 2 | | GROUP 3 | |
|---|---|---|---|---|---|---|
| USER | MUSICAL PIECE | 1 | 2 | 3 | 4 | 5 |
| GROUP 1 | 1 | 1 | 0 | φ | 3 | 4 |
|  | 2 | 0 | φ | φ | 4 | 3 |
| GROUP 2 | 3 | φ | 4 | 4 | φ | 2 |
|  | 4 | φ | 3 | φ | 1 | 1 |

R RATING MATRIX

| REPRESENTATIVE USER | REPRESENTATIVE MUSICAL PIECE | | |
|---|---|---|---|
|  | 1 | 2 | 3 |
| 1 | 0.33 | φ | 3.50 |
| 2 | 3.50 | 4.00 | 1.33 |

R' RATING MATRIX

Fig. 16

MUSICAL PIECE

RATING MATRIX $R$ → TRAINING MATRIX $R_t$, EVALUATION MATRIX $R_e$

Fig. 17

RATING MATRIX → TOP-3 RANKINGS

MUSICAL PIECE RECOMMENDATION SYSTEM AND METHOD

TECHNICAL FIELD

The present invention relates to a musical piece recommendation system, a musical piece recommendation method, and a musical piece recommendation computer program, and in particular to the improvement of the efficiency and scalability of musical piece recommendation techniques used in music distribution services.

BACKGROUND ART

A hybrid music recommendation technique that utilizes a Bayesian network called a three-way aspect model is disclosed in a paper titled "A Hybrid Music Recommender System based on Probabilistic Integration of User Ratings and Acoustic Features" (Non-Patent Document 1) presented in a collection of papers published in a research report meeting SIGMUS 66 held on Aug. 7, 2006 by the Information Processing Society of Japan. The known recommendation technique utilizes both "collaborative filtering" and "content-based filtering". The "collaborative filtering" technique recommends musical pieces to a certain user by considering ratings of musical pieces provided by other users. For example, in the case where a recommendation is made to a user that likes musical pieces A and B, a musical piece C is recommended to the user if there are many other users that like the musical pieces A, B, and C. However, the technique involves the following two issues:

(1) Unrated musical pieces (new or minor musical pieces) cannot be recommended.

(2) The recommended musical pieces are often well-known hit tunes, which leads to poor variations.

The "content-based filtering" technique recommends musical pieces that are similar to favorite musical pieces of a user by automatically extracting musical elements such as a genre or topic, a musical instrument arrangement, and acoustic features from audio signals. However, the technique involves the following two issues:

(1) The recommendation accuracy is low because the technique for automatically extracting musical elements is still in the research stage.

(2) Information that cannot be obtained from the audio signal but that is useful for recommendation (such as popularity and cultural background) is not considered.

The hybrid music recommendation technique has been developed in consideration of the issues of the two techniques. In the technique, a recommendation is made by considering rating information and content-based information at the same time to address the issues of the recommendation techniques according to the related art and improve the recommendation accuracy.

Specifically, the technique employs a scheme for probabilistically integrating "5-scale rating scores or rating histories given by users" and "acoustic features automatically extracted from audio signals" using a Bayesian network model (three-way aspect model). The Bayesian network model (three-way aspect model) is described in a paper titled "Probabilistic Models for Unified Collaborative and Content-based Recommendation in Sparse-data Environments" (Non-Patent Document 2) presented by A. Popescul, L. Ungar, D. Pennock, and S. Lawrence in UAI, 2001, pp. 437-444. The model directly models the musical preference of a user by expressing "conceptual topics, which are not directly observable, as "latent variables". Therefore, the generation process of observation data (musical piece ratings and acoustic features) can be naturally expressed. The probability values of respective branches connecting four nodes of the model are calculated using a maximum likelihood estimation method based on an EM algorithm. The integration scheme is found to be theoretical and highly reliable.

[Non-Patent Document 1] A paper titled "A Hybrid Music Recommender System based on Probabilistic Integration of User Ratings and Acoustic Features" presented in a collection of papers published in a research report meeting SIGMUS 66 held on Aug. 7, 2006

[Non-Patent Document 2] A paper titled "Probabilistic Models for Unified Collaborative and Content-based Recommendation in Sparse-data Environments" presented by A. Popescul, L. Ungar, D. Pennock, and S. Lawrence in UAI, 2001, pp. 437-444

DISCLOSURE OF INVENTION

Problem to be Solved by the Invention

According to the hybrid music recommendation technique of the related art, however, the training time is proportional to the number of musical pieces and the number of users, and even slight variations in data require retraining of the model. That is, according to the related art, the model cannot be instantaneously adapted when a certain user changes his/her rating, and in addition, new users and new musical pieces cannot be successively additionally registered in the model. This is because each variation in data requires retraining of the entire probabilistic model, which requires a training time proportional to the number of users and the number of musical pieces. The related art is thus inefficient. Also, in the related art, the number of musical pieces and the number of users are limited, which makes it practically impossible to handle data on the scale of millions of musical pieces and hundreds of thousands of users.

An object of the present invention is to provide a musical piece recommendation system, a musical piece recommendation method, and a musical piece recommendation computer program that allow instantaneous registration of a new user (including an existing user that has changed or made addition to his/her rating) and a new musical piece without retraining in a basic training section.

Another object of the present invention is to provide a musical piece recommendation system and a musical piece recommendation method that facilitates establishment of a basic training section that can handle data on the scale of millions of musical pieces and hundreds of thousands of users.

Still another object of the present invention is to provide a program that can be utilized to facilitate establishment of a basic training section that can handle data on the scale of millions of musical pieces and hundreds of thousands of users.

Means for Solving the Problems

In the present invention, in order to improve the efficiency, only parameters (probability values) in a probabilistic model related to variations in data are updated. Thus, the musical piece recommendation system according to the present invention includes a rating history storage section, an acoustic feature storage section, a musical piece recommendation section, a basic training section, a first incremental training section, and a second incremental training section.

The rating history storage section stores a plurality of rating histories obtained as a result of rating of at least one of a plurality of musical pieces performed by each of a plurality of users. The acoustic feature storage section stores acoustic features extracted from each of audio signals of the plurality of musical pieces. The musical piece recommendation section includes a probabilistic model including a plurality of variables and a plurality of parameters, and outputs a preference ranking of the plurality of musical pieces in response to a musical piece recommendation request from one of the users. The basic training section receives the plurality of rating histories and the plurality of acoustic features as inputs, and estimates the plurality of parameters in the probabilistic model to maximize a likelihood of the plurality of parameters.

The probabilistic model used in the musical piece recommendation section includes a musical piece variable node that stores variables related to the plurality of musical pieces, a user variable node that stores variables related to the plurality of users, a feature variable node that stores variables related to the plurality of acoustic features, and a latent variable node that stores a plurality of conceptual topics as latent variables. In the probabilistic model, a plurality of topic selection probabilities are defined between the user variable node and the latent variable node, and each of the topic selection probabilities corresponds to a probability with which when one of the users is selected, the user selects each of the plurality of topics. A plurality of musical piece selection probabilities are defined between the latent variable node and the musical piece variable node, and each of the musical piece selection probabilities corresponds to a probability with which when one of the topics is selected, each of the plurality of musical pieces is selected. A plurality of feature occurrence probabilities are defined between the latent variable node and the feature variable node, and each of the feature occurrence probabilities corresponds to a probability with which when one of the topics is selected, each of the variables related to the plurality of acoustic features occurs for the topic. The probabilistic model is a probabilistic model obtained by formulating a three-way aspect model in which the topic selection probability, the musical piece selection probability, and the feature occurrence probability are independent of each other. The formulated three-way aspect model includes the topic selection probability, the musical piece selection probability, and the feature occurrence probability as a plurality of parameters in a formula for calculating a generation probability of an event in which a certain user listens to a certain acoustic feature in a certain musical piece. The musical piece recommendation section is configured to output, in response to a musical piece recommendation request from one of the users, a preference ranking of the plurality of musical pieces for the user using the topic selection probability for the user, the musical piece selection probability, and the feature occurrence probability.

The first incremental training section used in the present invention monitors the rating history storage section, and each time a change is made to the rating history or a new user is added, performs updating of or addition of the topic selection probability for the user for which the change is made to the rating history or for the new user such that the likelihood determined by the basic training section is kept maximized.

The second incremental training section monitors the acoustic feature storage section, and each time a new musical piece is added to perform addition to the acoustic features, performs addition to the musical piece selection probability related to the added musical piece such that the likelihood determined by the basic training section is kept maximized.

That is, according to the present invention, estimation (training) is performed only on the topic selection probability, that is, the musical preference, of a new user only with reference to the rating history provided by the new user and the acoustic features of the rated musical piece. Also, estimation (training) is performed only on the musical piece selection probability of a new musical piece only with reference to the acoustic features of the new musical piece. That is, in the present invention, even when rating data are added by a new user or rating data are added or changed by an existing user, it is possible to recommend a musical piece without retraining in the basic training section in the related art, by performing estimation (training) only on the topic selection probability of the new user and the musical piece selection probability of the new musical piece and adding the estimation (training) results to the probabilistic model. Thus, according to the present invention, it is possible to easily add rating data provided by a new user, add or change rating data provided by an existing user, and add a musical piece without retraining in a basic training section. By using the system according to the present invention, it is possible to successively reflect data variations in the model.

The basic training section is also configured to include: a rating vector calculation section that calculates a plurality of rating vectors from the plurality of rating histories; a content vector calculation section that calculates a plurality of content vectors from the plurality of acoustic features; a likelihood calculation section that calculates the likelihood of the parameters for the plurality of rating vectors and the plurality of content vectors indicating the plurality of acoustic features; an updating section that updates the plurality of topic selection probabilities, the plurality of musical piece selection probabilities, and the plurality of feature occurrence probabilities to maximize the likelihood; and a convergence determination section that terminates operation of the likelihood calculation section and the updating section upon determining that an increase in the likelihood has converged. The thus configured basic training section can be constructed in accordance with existing techniques. When data on the scale of millions of musical pieces and hundreds of thousands of users are to be handled by the basic training section, however, considerable time is required for the training. Therefore, it is practically difficult for the basic training section to handle data on the scale of millions of musical pieces and hundreds of thousands of users (that is, to increase the scalability).

Thus, the musical piece recommendation system according to the present invention may further include a basic training section establishment system that establishes the basic training section. The basic training section establishment system may include a representative user determination section, a representative musical piece determination section, a core model training section, a first basic-training-section-establishing incremental training section, and a second basic-training-section-establishing incremental training section.

The representative user determination section determines a plurality of representative users by performing clustering on the plurality of users on the basis of a plurality of rating vectors calculated on the basis of the plurality of rating histories, and calculates a plurality of rating vectors for the plurality of representative users. The representative musical piece determination section determines a plurality of representative musical pieces by performing clustering on the plurality of musical pieces on the basis of a plurality of content vectors indicating the acoustic features of the plurality of musical pieces, and calculates a plurality of content vectors for the plurality of representative musical pieces.

The core model training section includes a probabilistic model for estimation obtained by formulating the three-way aspect model as a core model. The core model training section estimates the topic selection probability, the musical piece selection probability, and the feature occurrence probability of the core model on the basis of the plurality of rating vectors for the plurality of representative users and the plurality of content vectors for the plurality of representative musical pieces to maximize a likelihood of the topic selection probability, the musical piece selection probability, and the feature occurrence probability of the core model.

The first basic-training-section-establishing incremental training section receives the plurality of rating histories for each of the plurality of users stored in the rating history storage section as inputs, and sequentially adds the topic selection probabilities for each of the plurality of users such that the likelihood determined by the core model training section is kept maximized in order to add the plurality of users to the core model. The second basic-training-section-establishing incremental training section receives the plurality of acoustic features for each of the plurality of musical pieces stored in the acoustic feature storage section as inputs, and sequentially adds the musical piece selection probabilities for each of the plurality of musical pieces such that the likelihood determined by the core model training section is kept maximized in order to add the plurality of musical pieces to the core model. Finally, the basic training section is established as a model obtained as a result of addition of the plurality of topic selection probabilities for the plurality of users and the plurality of musical piece selection probabilities for the plurality of musical pieces to the core model of the core model training section performed by the first and second basic-training-section-establishing incremental training sections. With this configuration, it is only necessary to perform computation for estimation (training) on the topic selection probabilities for a plurality of users and for estimation (training) on the musical piece selection probabilities for a plurality of musical pieces in order to establish the basic training section. Therefore, the computation process can be easily performed even for data on the scale of millions of musical pieces and hundreds of thousands of users. Thus, by establishing the basic training section using the thus configured basic training section establishment system, the scalability can be enhanced as desired. In the system, in order to improve the scalability, specified numbers of representative users and representative musical pieces are virtually generated from large numbers of users and musical pieces, and a compact "core model" is constructed for the generated representative users and representative musical pieces. Then, the core model is updated while successively registering the users and the musical pieces on the basis of which the data are provided.

After the basic training section is established using the basic training section establishment system, the musical piece recommendation system further adds users and musical pieces using the established basic training section and the first and second incremental training sections discussed above. The recommendation accuracy may be reduced when the number of users to be added and the number of musical pieces to be added are too large. In such a case, the musical piece recommendation system may further include a recommendation accuracy determination section that determines whether or not a reduction in accuracy of recommendation performed by the musical piece recommendation section is larger than a predetermined allowable value. The basic training section establishment system is operated again to update the basic training section when the recommendation accuracy determination section determines that the reduction in the recommendation accuracy is larger than the predetermined allowable value. With this configuration, the basic training section estimates (updates) the parameters in the core model again on the basis of all the user rating data and all the musical piece data collected so far, which allows the reduced recommendation accuracy to recover.

The recommendation accuracy can be increased by first executing the addition performed by the second basic-training-section-establishing incremental training section and then the addition performed by the first basic-training-section-establishing incremental training section. This has been experimentally verified.

The present invention may also be considered as a musical piece recommendation method to be implemented utilizing a computer. In the musical piece recommendation method according to the present invention, a plurality of rating histories obtained as a result of rating of at least one of a plurality of musical pieces performed by each of a plurality of users are stored in a rating history storage section (a rating history storage step). Also, a plurality of acoustic features are extracted from audio signals of the plurality of musical pieces, and the plurality of acoustic features extracted from each of the plurality of musical pieces are stored in an acoustic feature storage section (an acoustic feature storage step). Any of the two steps may be executed earlier.

In a musical piece recommendation step, a preference ranking of the plurality of musical pieces is output using a probabilistic model in response to a musical piece recommendation request from one of the users. The probabilistic model used is the same as that used in the musical piece recommendation system discussed above.

Before execution of the musical piece recommendation step, a basic training step is executed. In the basic training step, the plurality of rating histories and the plurality of acoustic features are received as inputs, and the plurality of parameters in the probabilistic model are estimated to maximize a likelihood of the plurality of parameters. After termination of the basic training step, a first incremental training step and a second incremental training step can be executed at any time. In the first incremental training step, the rating history storage section is monitored, and each time a change is made to the rating history or a new user is added, addition of the topic selection probability for the user for which the change is made to the rating history or for the new user is performed such that the likelihood determined in the basic training step is kept maximized. In the second incremental training step, the acoustic feature storage section is monitored, and each time a new musical piece is added, updating of or addition of the musical piece selection probability related to the added musical piece is performed such that the likelihood determined in the basic training step is kept maximized. The first and second incremental training steps are executed as necessary, and any of the two steps may be performed in priority to the other.

The basic training step includes the following plurality of steps. A plurality of rating vectors are calculated from the plurality of rating histories (a rating vector calculation step). Also, a plurality of content vectors are calculated from the plurality of acoustic features (a content vector calculation step). Any of the two steps may be performed in priority to the other. The likelihood of the parameters for the plurality of rating vectors and the plurality of content vectors indicating the plurality of acoustic features is calculated (a likelihood calculation step). The plurality of topic selection probabilities, the plurality of musical piece selection probabilities, and the plurality of feature occurrence probabilities are estimated (updated) to maximize the likelihood (an updating step). The likelihood calculation step and the updating step are terminated when it is determined that an increase in the likelihood has converged (a convergence determination step).

The technique for establishing the basic training section discussed above may also be considered as a basic training section establishment method to be implemented on a computer. The basic training section establishment method establishes the basic training section using a computer, and includes the following plurality of steps. A plurality of representative users are determined by performing clustering on the plurality of users on the basis of a plurality of rating vectors calculated on the basis of the plurality of rating histories, and a plurality of rating vectors for the plurality of representative users are calculated (a representative user determination step). A plurality of representative musical pieces are determined by performing clustering on the plurality of musical pieces on the basis of a plurality of content vectors indicating the acoustic features of the plurality of musical pieces, and a plurality of content vectors for the plurality of representative musical pieces are calculated (a representative musical piece determination step). Any of the two steps may be performed in priority to the other. A core model training section is prepared that includes a probabilistic model for estimation obtained by formulating the three-way aspect model as a core model and that estimates the topic selection probability, the musical piece selection probability, and the feature occurrence probability of the core model on the basis of the plurality of rating vectors for the plurality of representative users and the plurality of content vectors for the plurality of representative musical pieces to maximize a likelihood of the topic selection probability, the musical piece selection probability, and the feature occurrence probability of the core model (a core model training section preparation step).

The plurality of rating histories for each of the plurality of users stored in the rating history storage section are received as inputs, and the topic selection probabilities for each of the plurality of users are sequentially added to the core model such that the likelihood determined by the core model training section is kept maximized in order to add the plurality of users to the core model (a first basic-training-section-establishing incremental training step). Also, the plurality of acoustic features for each of the plurality of musical pieces stored in the acoustic feature storage section are received as inputs, and the musical piece selection probabilities for the plurality of musical pieces are sequentially added to the core model such that the likelihood determined by the core model training section is kept maximized in order to add the plurality of musical pieces to the core model (a second basic-training-section-establishing incremental training step). The basic training section is established as a model obtained as a result of addition of the plurality of topic selection probabilities for the plurality of users and the plurality of musical piece selection probabilities for the plurality of musical pieces to the core model of the core model training section performed in the first and second basic-training-section-establishing incremental training steps.

The present invention may also be considered as a musical piece recommendation computer program for causing a computer to execute a musical piece recommendation method. The musical piece recommendation computer program according to the present invention is configured to cause a computer to implement the following functions. That is, the functions include a musical piece recommendation function, a basic training function, and first and second incremental training functions. The musical piece recommendation function is a function of outputting a preference ranking of a plurality of musical pieces using the same probabilistic model as that employed in the musical piece recommendation system in response to a musical piece recommendation request from one of users. The basic training function is a function of receiving a plurality of rating histories obtained as a result of rating of at least one of the plurality of musical pieces performed by each of the plurality of users stored in a rating history storage section and the plurality of acoustic features stored in an acoustic feature storage section as inputs, and estimating the plurality of parameters in the probabilistic model to maximize a likelihood of the plurality of parameters in the probabilistic model. The first incremental training function is a function of monitoring the rating history storage section, and each time a change is made to the rating history or a new user is added, performing updating of or addition of the topic selection probability for the user for which the change is made to the rating history or for the new user such that the likelihood determined by the basic training function is kept maximized. The second incremental training function is a function of monitoring the acoustic feature storage section, and each time a new musical piece is added, performing addition of the musical piece selection probability related to the added musical piece such that the likelihood determined by the basic training function is kept maximized.

The basic training function includes: a rating vector calculation function of calculating a plurality of rating vectors from the plurality of rating histories; a content vector calculation function of calculating a plurality of content vectors from the plurality of acoustic features; a likelihood calculation function of calculating the likelihood of the parameters for the plurality of rating vectors and the plurality of content vectors indicating the plurality of acoustic features; an updating function of updating the plurality of topic selection probabilities, the plurality of musical piece selection probabilities, and the plurality of feature occurrence probabilities to maximize the likelihood; and a convergence determination function of terminating the likelihood calculation function and the updating function when it is determined that an increase in the likelihood has converged.

A basic training section establishment computer program for causing a computer to implement the basic training section is configured to cause the computer to implement a representative user determination function, a representative musical piece determination function, a core model training section preparation function, and first and second basic-training-section-establishing incremental training functions. The representative user determination function is a function of determining a plurality of representative users by performing clustering on the plurality of users on the basis of a plurality of rating vectors calculated on the basis of the plurality of rating histories, and calculating a plurality of rating vectors for the plurality of representative users. The representative musical piece determination function is a function of determining a plurality of representative musical pieces by performing clustering on the plurality of musical pieces on the basis of a plurality of content vectors indicating the acoustic features of the plurality of musical pieces, and calculating a plurality of content vectors for the plurality of representative musical pieces. The core model training section preparation function is a function of preparing a core model training section that includes a probabilistic model for estimation obtained by formulating the three-way aspect model as a core model and that estimates the topic selection probability, the musical piece selection probability, and the feature occurrence probability of the core model on the basis of the plurality of rating vectors for the plurality of representative users and the plurality of content vectors for the plurality of representative musical pieces to maximize a likelihood of the topic selection probability, the musical piece selection probability, and the feature occurrence probability of the core model. The first basic-training-section-establishing incremental training function is a function of receiving the plurality of rating histories for each of the plurality of users stored in the rating history storage section as inputs, and sequentially adding the topic selection probabilities for each of the plurality of users such that the likelihood determined by the core model training section is kept maximized in order to add the plurality of users to the core model. The second basic-training-section-establishing incremental training function is a function of receiving the plurality of acoustic features for each of the plurality of musical pieces stored in the acoustic feature storage section as inputs, and sequentially adding the musical piece selection probabilities for each of the plurality of musical pieces such that the likelihood determined by the core model training section is kept maximized in order to add the plurality of musical pieces to the core model. In the program, the basic training section is established as a model obtained as a result of addition of the plurality of topic selection probabilities for the plurality of users and the plurality of musical piece selection probabilities for the plurality of musical pieces to the core model of the core model training section performed by the first and second basic-training-section-establishing incremental training functions.

The computer programs may be stored in a computer-readable storage medium.

Effects of the Invention

According to the present invention, it is possible to easily add rating data provided by a new user, add or change rating data provided by an existing user, and add a musical piece without retraining in a basic training section. By using the system according to the present invention, it is possible to successively reflect data variations in the model.

Also, when a basic training section establishment system is used, it is only necessary to perform computation for estimation (training) on the topic selection probabilities for a plurality of users and for estimation (training) on the musical piece selection probabilities for a plurality of musical pieces in order to establish the basic training section. Therefore, the computation process can be easily performed and the scalability can be enhanced as desired even for data on the scale of millions of musical pieces and hundreds of thousands of users.

BRIEF DESCRIPTION OF DRAWINGS

FIG. 4 is a flowchart showing an algorithm of a program used to implement the basic training section through a program.

FIG. 5 is a flowchart showing the details of step ST42.
FIG. 6 is a flowchart showing the details of step ST44.
FIG. 7 is a flowchart showing the details of step ST45.
FIG. 8 is a flowchart showing an algorithm of a program used to implement the embodiment of FIG. 1 using a computer.

FIG. 9 is a flowchart showing the details of step ST4.
FIG. 13 shows an example of calculation of a rating matrix R'.
FIG. 16 shows preparation of data for cross validation.
FIG. 17 shows an example of calculation of the recommendation accuracy.

DESCRIPTION OF REFERENCE NUMERALS

1 Musical Piece Recommendation System
3 Rating History Storage Section
5 Acoustic Feature Storage Section
7 Musical Piece Data Storage Section
9 Storage Device
11 Acoustic Feature Extraction Section
13 Probabilistic Model
15 Musical Piece Recommendation Section
17 Basic Training Section
19 First Incremental Training Section
21 Second Incremental Training Section
23 Basic Training Section Establishment System
25 Recommendation Accuracy Determination Section

BEST MODE FOR CARRYING OUT THE INVENTION

Figure 1:
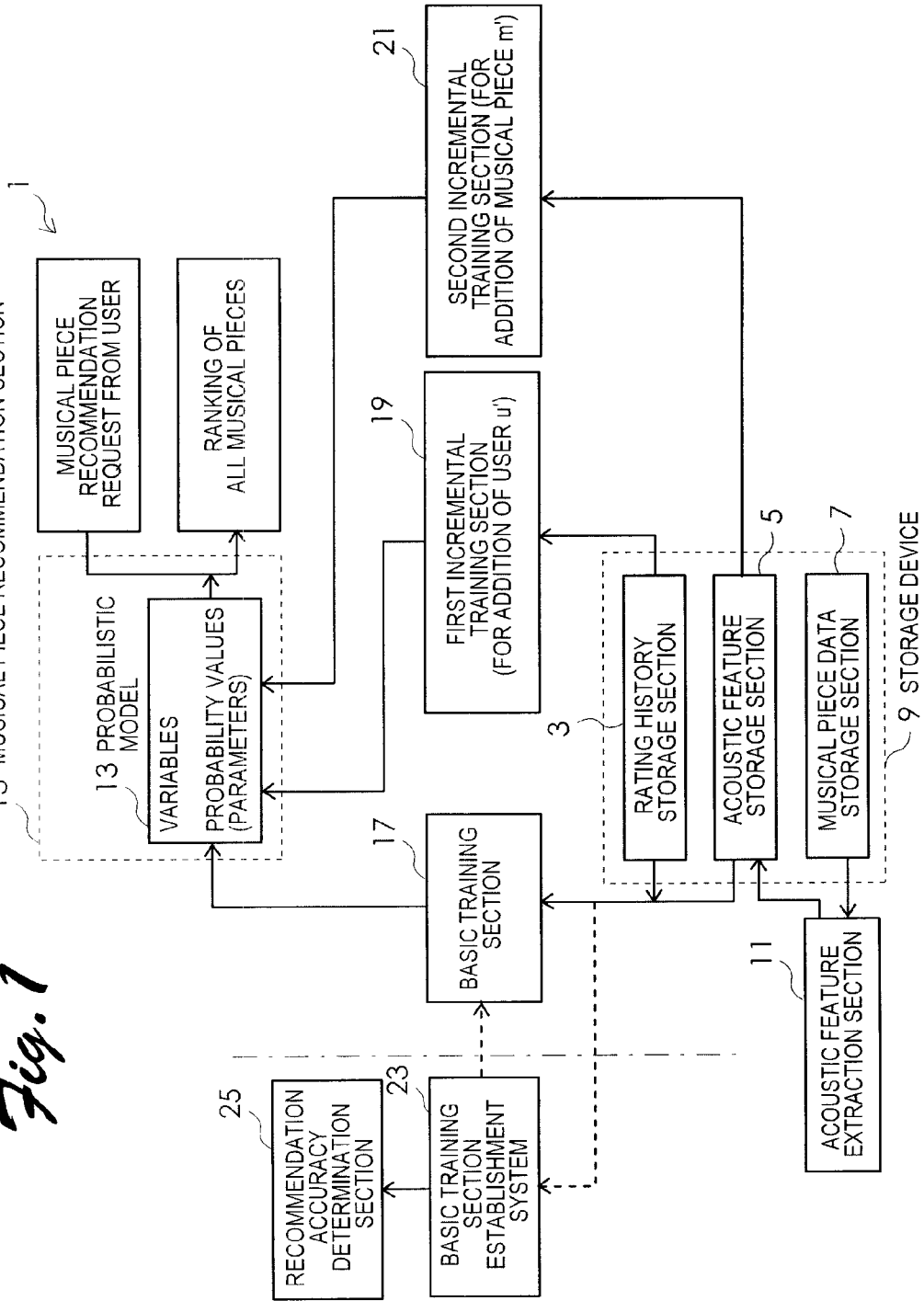
FIG. 1 is a block diagram showing an exemplary configuration of a musical piece recommendation system according an embodiment of the present invention

A musical piece recommendation system according to an embodiment of the present invention that implements a musical piece recommendation method of the present invention will be described in detail below with reference to the drawings. FIG. 1 is a block diagram showing an exemplary configuration of a musical piece recommendation system 1 according to the present embodiment. The musical piece recommendation system 1 includes a storage device 9 that includes a rating history storage section 3, an acoustic feature storage section 5, and a musical piece data storage section 7, and an acoustic feature extraction section 11. The musical piece recommendation system 1 further includes a musical piece recommendation section 15 that includes a probabilistic model 13. Also the musical piece recommendation system 1 includes a basic training section 17, a first incremental training section 19, and a second incremental training section 21. FIG. 1 also shows a basic training section establishment system 23 and a recommendation accuracy determination section 25 which are used in another embodiment of the present invention to establish the basic training section 17.

The rating history storage section 3 stores a plurality of rating histories obtained as a result of rating of at least one of a plurality of musical pieces performed by each of a plurality of users. A user group is represented as $U \equiv \{u_1, \ldots, u_{|U|}\}$, and a musical piece group is represented as $M \equiv \{m_1, \ldots, m_{|M|}\}$. Here, $|U|$ and $|M|$ respectively represent the number of users and the number of musical pieces, and U and M are registered in a database in advance. The musical piece recommendation system according to the present invention is based on a probabilistic model, and $u \in U$ and $m \in M$ are treated as random variables. Other additional information (such as title, artist name, and genre or topic) is not utilized for musical piece recommendation. The rating histories of the musical pieces provided by the users are registered in the rating history storage section 3. The rating histories may be changed or increased if the users rate the musical pieces again. In the embodiment, the rating scores or rating histories of the musical pieces are in five scales ranging from 0 (the lowest score, the least favorite) to 4 (the highest score, the most favorite), and $r_{u,m}$ ($0 \leq r_{u,m} \leq 4$) is defined as the score of a musical piece m given by a user u. In the case where the user u has not rated the musical piece m, $\phi$ is substituted for $r_{u,m}$ as a symbol representing an "empty score" for convenience. A rating matrix R is obtained by collecting the rating histories provided by all the users:

$$R = \{r_{u,m} | u \in U, m \in M\} \quad (1)$$

It should be noted that most elements in the rating matrix R are $\phi$ because the users give a rating score or rating history to only a part of the musical pieces in the musical piece group M.

The acoustic feature storage section 5 stores a plurality of acoustic features automatically extracted by the acoustic feature extraction section 11 from each of audio signals of a plurality of musical pieces stored in the musical piece data storage section 7. The acoustic features are represented as a content matrix C. The content matrix C is data in a matrix of M rows by T columns in which the weight $c_{m,t}$ of a feature t, for example, in a musical piece m is arranged. It is assumed, for example, that the number of features T is 64 dimensions, and that the acoustic features of one musical piece can be expressed by one feature vector (content vector). Specifically, it is assumed that the respective dimensions of the feature vector are equivalent in meaning, and that the sum of the feature vectors for the dimensions is normalized to 1. For example, power ratios for each average frequency band of the entire musical piece, or the weights obtained by fitting an acoustic feature group extracted from small time frames using mixture Gaussian distribution, are considered. In the embodiment, it is assumed that audio signals corresponding to the group of musical pieces M are available. Now, $T \equiv \{t_1, \ldots, t_{|T|}\}$ is defined as the features. $|T|$ represents the number of types of features (the dimensions of the feature vector). $c_{m,t}$ is defined as the weight of a feature t extracted from a musical piece m. Here, $\Sigma_t c_{m,t} = 1$ is satisfied. The content matrix C is obtained by collecting the feature vectors of all the musical pieces:

$$C = \{c_{m,t} | m \in M, t \in T\} \quad (2)$$

In the embodiment, a multiple-timbres distribution matrix C is generated as the content matrix C using a Bags-Of-Timbres method proposed earlier by the inventors in Non-Patent Document 1 discussed above.

Figure 2:
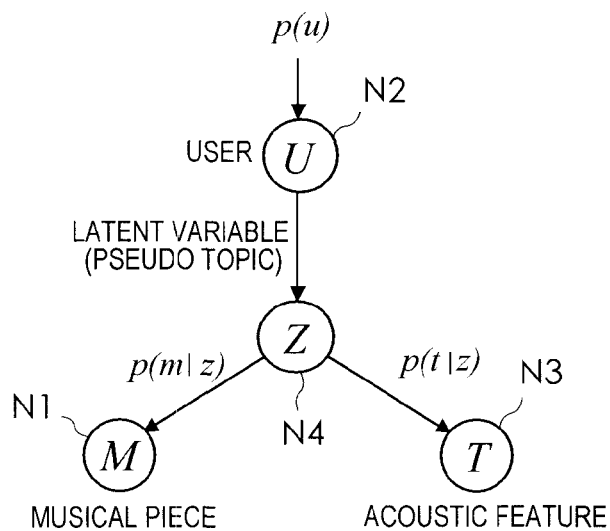
FIG. 2 is a schematic diagram showing a three-way aspect model used in the embodiment.

The musical piece recommendation section 15 includes a probabilistic model 13 including a plurality of variables and a plurality of parameters, and is configured to output a preference ranking of the plurality of musical pieces in response to a musical piece recommendation request from one of the users. In the embodiment, in order to integrate the rating histories and the musical content, that is, the acoustic features, of the musical pieces, a Bayesian network called a three-way aspect model proposed by Popescul et al. in Non-Patent Document 2 discussed above is utilized as the probabilistic model 13. FIG. 2 is a schematic diagram showing the three-way aspect model used in the embodiment. The probabilistic model includes a musical piece variable node N1 that stores variables related to the plurality of musical pieces M, a user variable node N2 that stores variables related to the plurality of users U, a feature variable node N3 that stores variables related to the plurality of acoustic features, and a latent variable node N4 that stores a plurality of conceptual topics as latent variables. In the probabilistic model 13, a plurality of topic selection probabilities $p(z|u)$ are defined between the user variable node N2 and the latent variable node N4, and each of the topic selection probabilities $p(z|u)$ corresponds to a probability with which when one of the users u is selected, the user u selects each of the plurality of topics Z. The topic selection probability $p(z|u)$ is a probability with which the user u selects the topic Z, and indicates the musical preference of the user. Also, a plurality of musical piece selection probabilities $p(m|z)$ are defined between the latent variable node N4 and the musical piece variable node N1, and each of the musical piece selection probabilities $p(m|z)$ corresponds to a probability with which when one of the topics is selected, each of the plurality of musical pieces is selected. Further, a plurality of feature occurrence probabilities $p(t|z)$ are defined between the latent variable node N4 and the feature variable node N3, and each of the feature occurrence probabilities $p(t|z)$ corresponds to a probability with which when one of the topics is selected, each of the variables related to the plurality of acoustic features occurs for the topic. The probabilistic model 13 is a probabilistic model obtained by formulating a three-way aspect model in which the topic selection probability $p(z|u)$, the musical piece selection probability $p(m|z)$, and the feature occurrence probability $p(t|z)$ are independent of each other. In addition, the formulated three-way aspect model includes the topic selection probability $p(z|u)$, the musical piece selection probability $p(m|z)$, and the feature occurrence probability $p(t|z)$ as a plurality of parameters in a formula for calculating a generation probability of an event in which a certain user u listens to a certain acoustic feature in a certain musical piece m, which will be discussed later. The musical piece recommendation section 15 outputs, in response to a musical piece recommendation request from one of the users, a preference ranking of the plurality of musical pieces with a high musical piece recommendation probability $p(m|u)$ for the user using the topic selection probability for the user, the musical piece selection probability, and the feature occurrence probability. That is, the musical piece recommendation section 15 recommends the plurality of musical pieces m with a high musical piece recommendation probability $p(m|u)$.

For more general description, latent variables (pseudo-topics) are introduced in the probabilistic model shown in FIG. 2, and the probabilistic model can probabilistically express the generation process of information in two nodes. Observation data such as the rating histories and the musical piece content (acoustic features) are associated with the latent variables $Z = \{z|z_1, \ldots, z_{|Z|}\}$. Here, $|Z|$ is the number of latent variables. It should be noted that although it facilitates understanding to consider that the latent variables correspond to the topics, the latent variables are merely convenient and conceptual elements and are not equivalent to the topics in a general sense. In the probabilistic model shown in FIG. 2, the musical preference of a user which does not directly appear in the observation data is expressed as the probabilistic relationship between the users U and the topics Z. That is, the preference of a certain user u is determined by the appearance probability p(z|u) of each topic z. The model can naturally express the process in which the user u selects the topic z in accordance with his/her preference p (z|u), and in which the topic z probabilistically generates the musical piece m and the acoustic feature t. In the three-way aspect model, it is assumed that the users U, the musical pieces M, and the acoustic features T are conditionally independent via the latent variables Z. Also, each user is allowed to have preferences for a plurality of topics. This is different from many clustering methods in which each user is assigned to any one of topic classes.

Now, formulation of a three-way aspect model will be described. In the embodiment, a three-way aspect model is formulated. A triplet (u, m, t) represents the co-occurrence of a user u, a musical piece m, and multiple timbres (acoustic features) t. This corresponds to an event in which "the user u listens to the multiple timbres t in the musical piece m", which is observable. Further, n(u, m, t) is defined as the number of occurrences of the above event, and it is assumed that n(u, m, t) can be decomposed as the product of two observation data as follows:

$$n(u,m,t) = r_{u,m} \times c_{m,t} \quad (3)$$

Here, $r_{u,m}$ and $c_{m,t}$ are defined as follows:

$r_{u,m}$ is the rating score or rating history of the musical piece m provided by the user u. If such rating has not been done, a value of 2.5 (or $\phi$) is substituted as a default score.

$c_{m,t}$ is the weight of the multiple timbres (acoustic features) t in the musical piece m. It is considered that the event (u, m, t) is more likely to occur as the user u likes the musical piece m better, or as the weight of the multiple timbres (acoustic features) t in the musical piece m is larger.

Likewise, a quadruplet (u, m, t, z) represents the co-occurrence of a user u, a musical piece m, multiple timbres (acoustic features) t, and a topic z. This corresponds to an event in which "the user u selects the topic z, and the topic z generates the musical piece m and the multiple timbres (acoustic features) t", which is unobservable. The generation probability p(u, m, t, z) of the above event is given by the following formula:

$$p(u,m,t,z) = p(u)p(z|u)p(m|z)p(t|z) \quad (4)$$

Here, p(u) is the prior probability of the user u, p(z|u) is the probability with which the topic z is generated in the case where the user u is given, and p(m|z) and p(t|z) are respectively the probabilities with which the musical piece m and the multiple timbres (acoustic features) t are generated in the case where the topic z is given. By marginalizing out z in the above formula, the generation probability p(u, m, t) of the event (u, m, t) is calculated as follows:

[Expression 1]

$$p(u, m, t) = \sum_z p(u)p(z|u)p(m|z)p(t|z) \quad (5)$$

Unknown parameters in the model are $\{p(z|u)|z \in Z, u \in U\}$, $\{p(m|z)|m \in M, z \in Z\}$ and $\{p(t|z)|t \in T, z \in Z\}$. These are estimated by the basic training section 17 using the rating matrix R and the content matrix C which are observation data. To perform recommendation, musical pieces that have not been rated by the user u are ranked in accordance with $p(m|u) \propto \Sigma_t p(u, m, t)$.

That is, the basic training section 17 receives the plurality of rating matrices (rating scores or rating histories) R and the plurality of acoustic features, that is, content matrices C, as inputs, and estimates the plurality of parameters (probability values) in the probabilistic model to maximize a likelihood of the plurality of parameters. A method for estimating the unknown parameters is described. First, assuming that an event (u, m, t) is independently generated, the likelihood L of the parameters for training data (the rating matrices R and the content matrices C) is given as follows:

[Expression 2]

$$L = \prod_{u,m,t} p(u, m, t)^{n(u,m,t)} \quad (6)$$

$$= \prod_{u,m,t} \left( \sum_z p(u)p(z|u)p(m|z)p(t|z) \right)^{n(u,m,t)} \quad (7)$$

The parameters to be obtained maximize the likelihood L. In order to solve a problem for maximizing the likelihood L which includes latent variables, an EM algorithm is utilized in the embodiment. Alternatively, a DAEM algorithm may be utilized in place of the EM algorithm. The DAEM algorithm is described in detail in a paper titled "Deterministic Annealing EM Algorithm" written by N. Ueda and R. Nakano (Neural Net., Vol. 11, No. 2, pp. 271, 282, 1998). The DAEM algorithm can advantageously avoid falling into a local solution compared to the ordinary EM algorithm.

Figure 3:
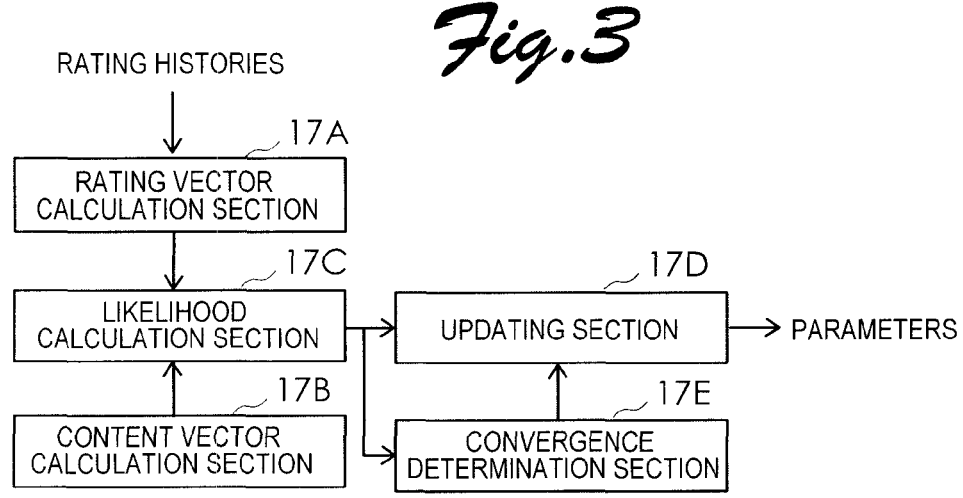
FIG. 3 is a block diagram showing an exemplary configuration of a basic training section configured by utilizing an EM algorithm.

FIG. 3 is a block diagram showing an exemplary configuration of the basic training section 17 configured by utilizing the EM algorithm. FIG. 4 is a flowchart showing an algorithm of a computer program used to implement the basic training section 17 on a computer. As can be seen from FIG. 4, in step ST41, rating histories provided by a plurality of existing users are prepared. In step ST42, a plurality of rating vectors are calculated using the plurality of rating scores or rating histories. The details of step ST42 are shown in FIG. 5. That is, in step ST42A, when a certain user is given, a default score is substituted for musical pieces that have not been rated by the user. Then, in step ST42B, the rating histories for all the musical pieces are collected to generate rating vectors corresponding to the user. Also, in step ST43, a plurality of acoustic features extracted from audio signals of a plurality of existing musical pieces are prepared. Then, in step ST44, the plurality of acoustic features are collected to calculate a plurality of content vectors. The details of step ST44 are shown in FIG. 6. That is, in step ST44A, when a certain audio signal is given, mel-frequency cepstral coefficients are calculated from the audio signal. Then, in step ST44B, mixture Gaussian distribution with fixed average and variance is fitted to the mel-frequency cepstral coefficients (to estimate only the weights). Lastly, in step ST44C, the estimated weights are collected to generate content vectors for the audio signal. The number of mixed Gaussian distributions is equal to the number of dimensions of the content vectors. Lastly, in step ST45, the three-way aspect model is trained using the EM algorithm. The details of step ST45 are shown in FIG. 7. That is, in step ST45A, a plurality of parameters in the aspect model are initialized. Next, in step ST45B, the likelihood L of the plurality of parameters for the rating vectors and the content vectors is calculated. Then, in step ST45C, the plurality of parameters (probability values) are updated to maximize the likelihood L. Then, in step ST45D, it is determined whether or not an increase in the likelihood has converged (has become a threshold or less). In step ST45, steps ST45B to ST45D are repeated until a convergence is determined. When a convergence is determined, steps ST45B to ST45D are terminated.

The configuration of the basic training section 17 shown in FIG. 3 is implemented by the algorithms of FIGS. 4 and 7. A rating vector calculation section 17A calculates a plurality of rating vectors from the plurality of rating histories. A content vector calculation section 17B calculates a plurality of content vectors from the plurality of acoustic features. A likelihood calculation section 17C calculates the likelihood of the plurality of parameters for the plurality of rating vectors and the plurality of content vectors. An updating section 17D updates the plurality of parameters (the plurality of topic selection probabilities, the plurality of musical piece selection probabilities, and the plurality of feature occurrence probabilities) to maximize the likelihood. A convergence determination section 17E terminates operation of the likelihood calculation section 17C and the updating section 17D upon determining that an increase in the likelihood has converged.

The musical piece recommendation system according to the embodiment uses a model-based algorithm. In the model-based algorithm, as discussed above, the entire observation data (the rating matrix R and the content matrix C) are always referenced to perform recommendation. In the model-based algorithm, also, a probabilistic model for estimating the musical preference of a user is constructed using the observation data, and thereafter, recommendation is performed on the basis of the probabilistic model. In the case where the model-based algorithm is used, preparatory model training (computation performed in the basic training section 17) takes much time although recommendation itself can be performed immediately. Thus, in the case where the model-based algorithm is used, it is an issue how to cut the model training cost.

The cost of training the aspect model using the DAEM algorithm discussed above is O(|U||M|) with |T| and |Z| constant (specifically, |T| and |Z| are respectively 64 and 10 in the case of the embodiment). This causes two serious issues. The first issue is related to the efficiency. It is necessary to perform model training again, which requires a high cost, each time the observation data vary. The second issue is related to the scalability.

The temporal and spatial costs (the training time and the required memory) increase rapidly in the order of O(|U||M|). The efficiency and scalability are practically very important elements. In the related art, however, little consideration has been given to these elements.

Thus, in the embodiment, in order to improve the efficiency, first and second incremental training sections 19 and 21 are provided for applying an incremental training method to the probabilistic model 13 based on the three-way aspect model. An incremental training method for a basic aspect model for collaborative filtering is disclosed in a paper titled "An Efficient Solution to Factor Drifting Problem in the pLSA Model" presented by L. Zhang, C. Li, Y. Xu, and B. Shi (CIT, 2005, pp. 175-181). In the embodiment, the known incremental training method is enhanced to consider the content information.

In the embodiment, the first incremental training section 19 monitors the rating history storage section 3, and each time a change is made to the rating history or a new user is added, updates the probabilistic model 13 using the topic selection probability p(z|u') for the user for which the change is made to the rating history or adds the topic selection probability p(z|u') to the probabilistic model 13 for the new user u' such that the likelihood L determined by the basic training section 17 is kept maximized. Also, the second incremental training section 21 monitors the acoustic feature storage section 5, and each time a new musical piece is added to perform addition to the acoustic features, adds the musical piece selection probability p(m'|z) related to the added musical piece m' to the probabilistic model 13 such that the likelihood L determined by the basic training section 17 is kept maximized.

Now, a method by which the first and second incremental training sections 19 and 21 successively update the parameters (the updated or added topic selection probability and the added musical piece selection probability) in the probabilistic model 13 based on the three-way aspect model in the embodiment will be discussed. In the following description, a probabilistic model obtained using the DAEM algorithm in the training performed in the basic training section 17 is called a base model, and a probabilistic model updated using the incremental training method is called an updated model. To generate the updated model, the following three cases are addressed separately:

(1) Adapting the model to an existing user u' that has given a new rating history (updating of a profile of an existing user).

(2) Additionally registering a new user u' that has given several rating histories in the model (updating of a profile of a new user).

(3) Additionally registering a new musical piece m' that has been given no rating histories in the model (additional registration of a new musical piece).

While the size of the probabilistic model is not increased in the first case (1), the size of the probabilistic model is increased in the remaining two cases (2) and (3) because a new user u' or a new musical piece m' is added.

First, the updating of a profile of an existing user in (1) above executed by the first incremental training section 19 is described. Conditional probabilistic distribution {p(z|u)|z∈Z} which represents the musical preference, that is, the topic selection probability, of a certain user u is called a user profile. In the embodiment, the probabilistic model 13 assumes that the user profiles of all the users are independent. Thus, in the case where a certain user varies his/her rating history, it is only necessary to update the user profile (topic selection probability) of the user such that the likelihood L determined by the basic training section 17 is kept maximized.

A case is considered where an existing user u'∈U varies his/her rating history when the likelihood L is maximized and the user profile {p(z|u')|z∈Z} is to be updated. Assuming that parameters which do not involve the user u' are constant, the maximization of the likelihood L after the rating history change is equivalent to the maximization of the sum of terms that involve the user u' in the likelihood L. Defining Lu' as the likelihood related to the user u', Lu' is calculated as follows:

[Expression 3]

$$L_{u'} = \sum_{m,t} n(u', m, t)\log p(m, t | u') \quad (8)$$

$$= \sum_{\langle m,t|u'\rangle} \log p(m, t | u') \quad (9)$$

In the above expression, an operator $\Sigma_{\langle m,t|u'\rangle}$ which represents $\Sigma_{m,t} n(u', m, t)X$ for a variable X is conveniently introduced.

The formula (9) can be transformed using Jensen's inequality as follows:

[Expression 4]

$$L_{u'} = \sum_{\langle m,t|u'\rangle} \log \sum_z p(m|z)p(t|z)p(z|u') \qquad (10)$$

$$= \sum_{\langle m,t|u'\rangle} \log \sum_z \frac{p(m|z)p(t|z)}{\delta_{m,t}} p(z|u')\delta_{m,t} \geq \qquad (11)$$

$$\sum_{\langle m,t|u'\rangle} \sum_z \frac{p(m|z)p(t|z)}{\delta_{m,t}} \log p(z|u') + \sum_{\langle m,t|u'\rangle} \log \delta_{m,t} \qquad (12)$$

Here, the following auxiliary function $\delta_{m,t}$ is introduced:

[Expression 5]

$$\delta_{m,t} = \sum_z p(m|z)p(t|z) \qquad (13)$$

Considering that the musical piece selection probability $p(m|z)$ and the feature occurrence probability $p(t|z)$ are constant in the above formula, the maximization of the likelihood Lu' is equivalent to the maximization of the first term of the formula (12). That is, the following constrained maximization problem is obtained:

[Expression 6]

$$\text{Maximize } \tilde{L}_{u'} = \sum_{\langle m,t|u'\rangle} \sum_z \frac{p(m|z)p(t|z)}{\delta_{m,t}} \log p(z|u') \qquad (14)$$

$$\text{s.t.} \sum_z p(z|u') = 1 \qquad (15)$$

The problem can be solved using a Lagrangian undetermined multiplier method. Defining $\lambda$ as a Lagrange undetermined multiplier, a new function $L^*_{u'}$ is defined as follows:

[Expression 7]

$$L^*_{u'} = L_{u'} - \lambda \left( \sum_z p(z|u') - 1 \right) \qquad (16)$$

When the function $L^*_{u'}$ is partially differentiated with respect to $p(z|u')$, the following formula is obtained:

[Expression 8]

$$\frac{\partial L^*_{u'}}{\partial p(z|u')} = \frac{\sum_{\langle m,t|u'\rangle} \frac{p(m|z)p(t|z)}{\delta_{m,t}}}{p(z|u')} - \lambda \qquad (17)$$

In order to maximize the target function $L_{u'}$, it is necessary that the formula (17) is equal to zero. Thus, the following equation is obtained:

[Expression 9]

$$\lambda p(z|u') = \sum_{\langle m,t|u'\rangle} \frac{p(m|z)p(t|z)}{\delta_{m,t}} \qquad (18)$$

Next, the formula (18) is substituted into the formula (15) to calculate $\lambda$:

[Expression 10]

$$\sum_z p(z|u') = 1 \Leftrightarrow \lambda = \sum_z \sum_{\langle m,t|u'\rangle} \frac{p(m|z)p(t|z)}{\delta_{m,t}} \qquad (19)$$

$$\Leftrightarrow \lambda = \sum_{\langle m,t|u'\rangle} \frac{\sum_z p(m|z)p(t|z)}{\delta_{m,t}} \qquad (20)$$

$$\Leftrightarrow \lambda = \sum_{m,t} n(u',m,t) \qquad (21)$$

Finally, the following user profile updating formula is obtained:

[Expression 11]

$$p(z|u') = \frac{\sum_{m,t} n(u',m,t) \frac{p(m|z)p(t|z)}{\sum_{z'} p(m|z')p(t|z')}}{\sum_{m,t} n(u',m,t)} \qquad (22)$$

Now, the updating of a profile of a new user (the topic selection probability) in Case (2) above executed by the first incremental training section 19 is described. A case is considered where a user profile $\{p(z|u')|z\epsilon Z\}$ of a new user $u'\epsilon U$ is to be newly generated. The new user u' has given rating histories $\{r_{u',m}|m\epsilon M\}$ to existing musical pieces. Therefore, the above formula (22) can also be applied to this case. At this time, the musical piece selection probability $p(m|z)$ and the feature occurrence probability $p(t|z)$ which have been trained by the basic training section 17 using the rating histories of the existing users are used.

Defining $\Delta|M|$ as the number of rating histories given by a new user u' (in the case where u' is an existing user, the number of added or changed rating histories), the computational cost of the updating is $O(\Delta|M|)$. Hence, in the above formula (22), it is only necessary to recalculate terms related to such musical pieces.

Now, the additional registration of a new musical piece in Case (3) above executed by the second incremental training section 21 is described. A case is considered where a new musical piece m' is given and the conditional probability $\{p(m'|z)|z\epsilon Z\}$, that is, the musical piece selection probability, is to be estimated. The same approach as described above can also be applied to this case. After the conditional probabilistic distribution $\{p(z|m')|z\epsilon Z\}$ is obtained, $p(m'|z)$ is given by $p(m'|z) \propto p(z|m')/p(z)$. At this time, it should be noted that the new musical piece m' has been given no rating histories and therefore only the content vectors $\{c_{m,t}|t\epsilon T\}$, that is, the acoustic features, are available. Thus, the updating formula for the addition of the new musical piece (addition of the musical piece selection probability p(m'|z) of the new musical piece m') is given as follows:

[Expression 12]

$$p(z|m') = \frac{\sum_t c_{m',t} \frac{p(t|z)}{\sum_{z'} p(t|z')}}{\sum_t c_{m',t}} \quad (23)$$

The computational cost of the updating is in the order of a constant.

As can be seen from the above description, the computational cost of the probabilities in Cases (1) to (3) above is very low compared to the computational cost required by the retraining performed in the basic training section 17 in the related art. Thus, according to the embodiment, the efficiency can be significantly increased compared to the conventional musical piece recommendation system and method.

FIG. 8 is a flowchart showing an algorithm of a program used to implement the embodiment of FIG. 1 using a computer. In step ST1, the basic training section 17 is established. In step ST2, all the parameters in the probabilistic model 13 are updated. Then, in step ST3, it is determined whether addition of rating histories provided by a user (which may include updating of rating histories provided by an existing user) is performed. Step ST3 is executed by monitoring addition of rating data to the rating history storage section 3 or a change in rating data in the rating history storage section 3. Then, only when rating histories provided by a new user u' are added (rating histories provided by an existing user are updated), in step ST4, the topic selection probability p(z|u') is estimated, and additionally registered in the probabilistic model 13 based on the three-way aspect model. In the case where rating histories provided by an existing user are changed, only the updated topic selection probability of the existing user is estimated and updated. FIG. 9 shows the details of step ST4. In step ST4A, updated rating histories or rating histories provided by a new user are acquired. Then, in step ST4B, rating vectors are calculated from the rating histories. Further, in step ST4C, the topic selection probability of the new user is estimated using the rating vectors, and additionally registered in the probabilistic model 13 based on the three-way aspect model.

Figure 10:
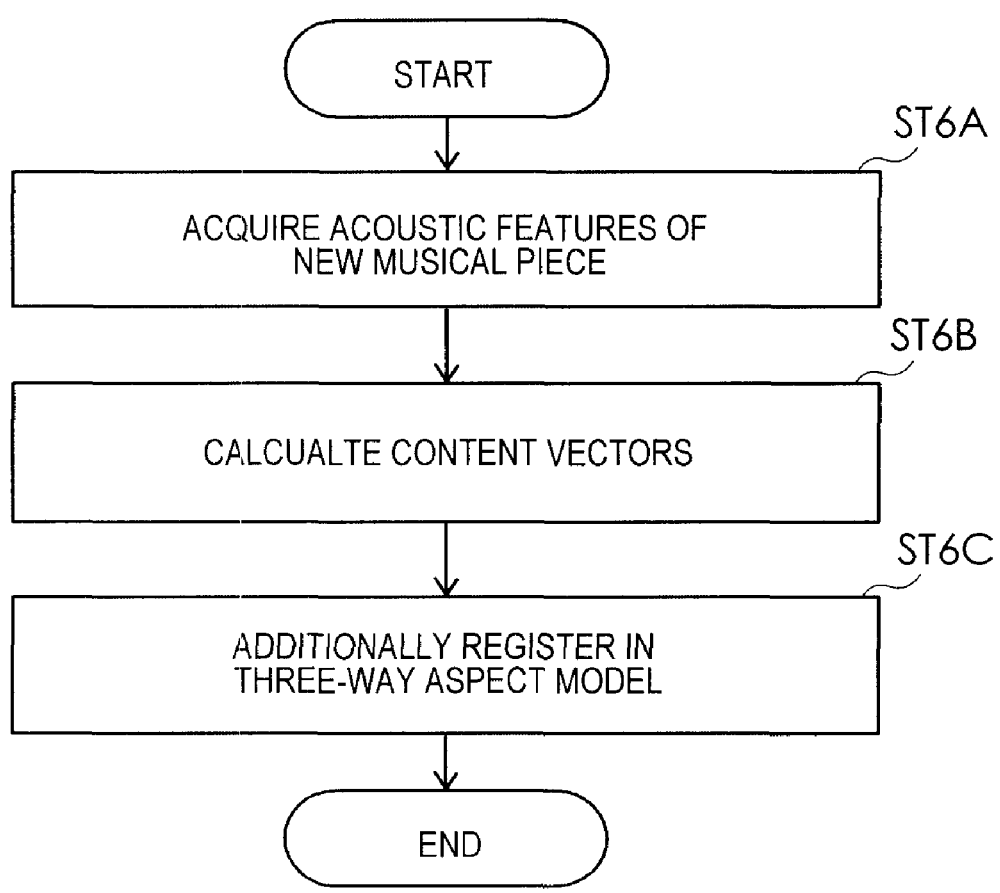
FIG. 10 is a flowchart showing the details of step ST6.

In step ST5, it is determined whether or not a new musical piece is added. The determination is performed by monitoring whether or not musical piece data on a new musical piece are stored in the musical piece data storage section 7, the acoustic feature extraction section 11 extracts new acoustic features from the musical piece data (audio signals), and the acoustic features are newly stored in the acoustic feature storage section 5. In the case where it is determined that a new musical piece is added, the process proceeds to step ST6. In step ST6, the musical piece selection probability p(m'|z) for the new musical piece m' is estimated, and additionally registered in the probabilistic model 13 based on the three-way aspect model. FIG. 10 shows the details of step ST6. In step ST6A, the acoustic features of the new musical piece are acquired. In step ST6B, content vectors are calculated from the acoustic features. Then, in step ST6C, the musical piece selection probability is estimated using the content vectors, and additionally registered in the three-way aspect model.

In step ST7, it is determined whether or not a musical piece recommendation request is received from a certain user. Then, in the case where a musical piece recommendation request is received, in step ST8, the musical piece recommendation section 15 ranks all the musical pieces adapted to the user or ranks the musical pieces in the descending order of the recommendation probability p(m|u), and outputs the ranking. In the case where no musical piece recommendation request is received, the process proceeds to step ST9. In step ST9, it is determined whether or not a termination command is input. If a termination command is received, the process is terminated. If no termination command is received, the process returns to step ST3.

Figure 11:
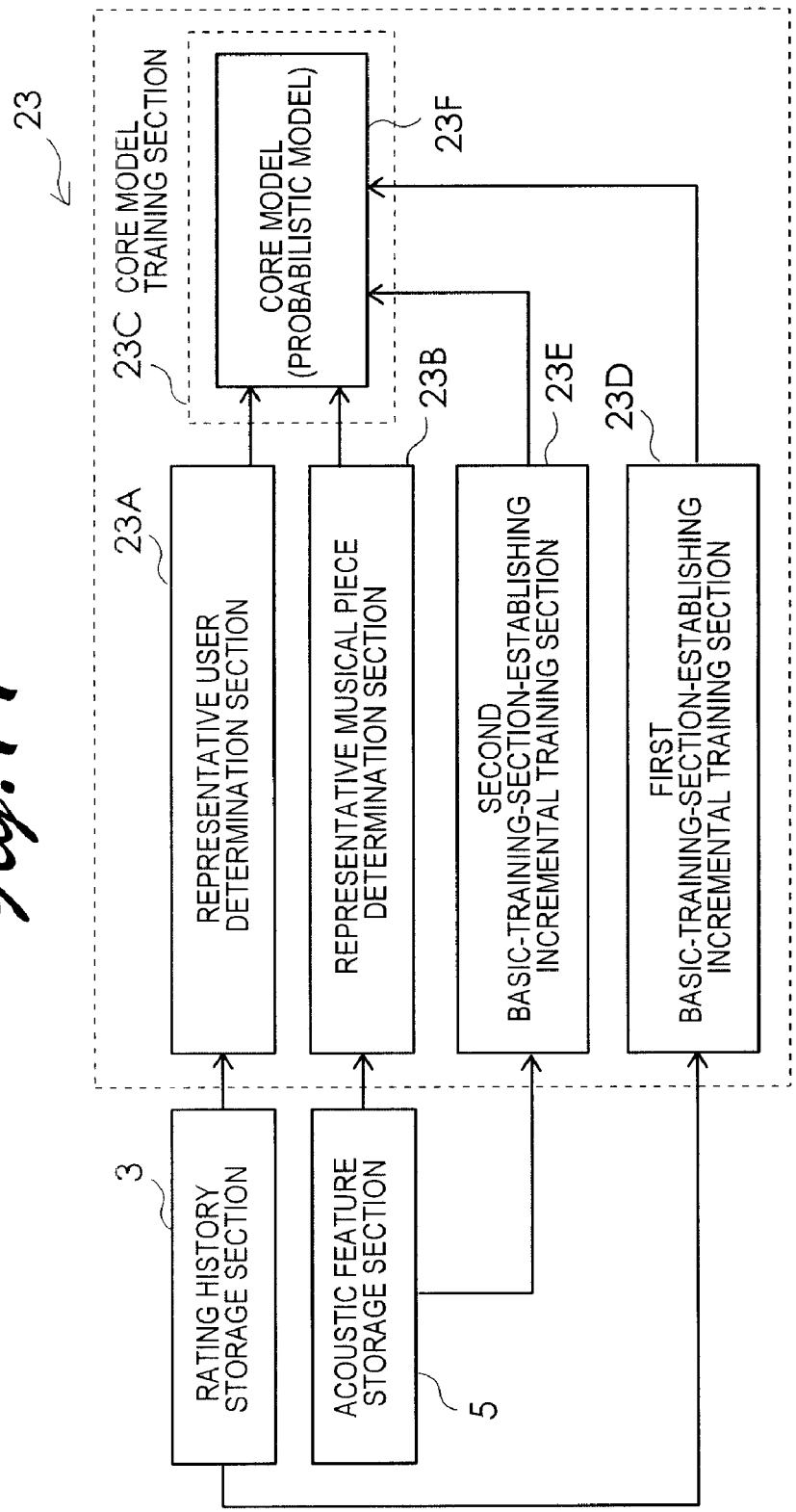
FIG. 11 is a block diagram showing an exemplary configuration of a basic training section establishment system.
Figure 12:
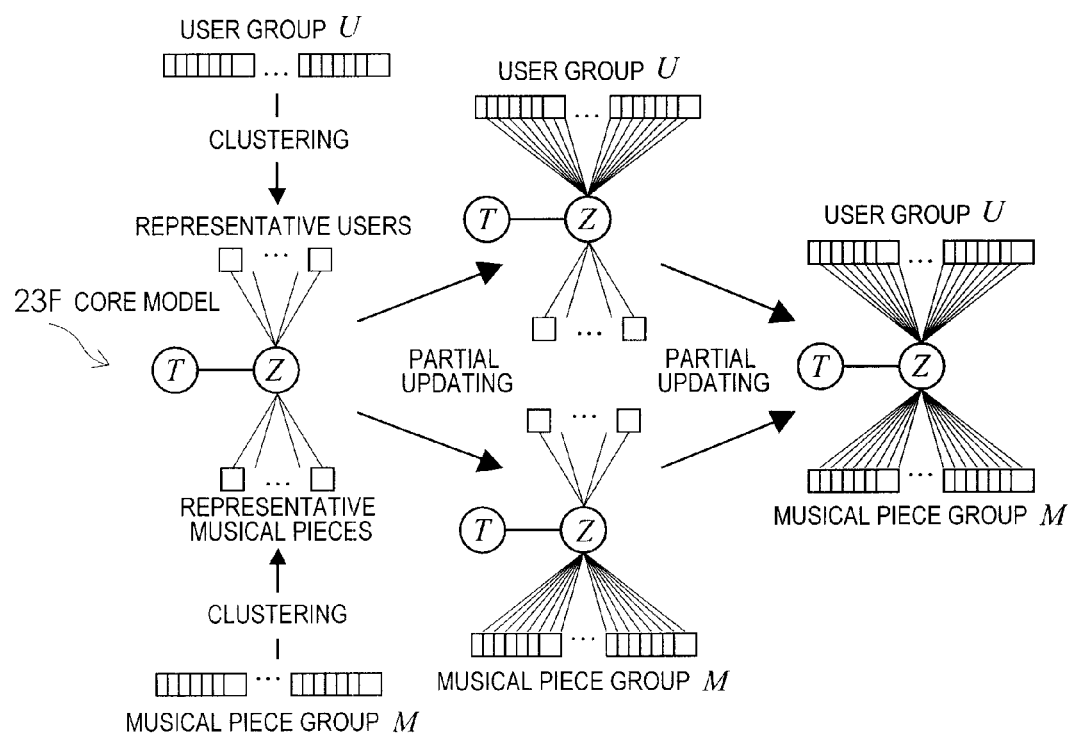
FIG. 12 schematically shows the state of operation of the basic training section establishment system.

In the above embodiment, the basic training section 17 is established using the same training method as in the related art. When data on the scale of millions of musical pieces and hundreds of thousands of users are to be handled by the basic training section established in accordance with the existing training method, however, considerable time is required for the training. Therefore, it is practically difficult for the basic training section 17 to handle data on the scale of millions of musical pieces and hundreds of thousands of users (that is, to increase the scalability). Thus, in another embodiment of the present invention, a basic training section establishment system 23 that establishes a basic training section is used to improve the scalability. FIG. 11 is a block diagram showing an exemplary configuration of the basic training section establishment system 23. FIG. 12 schematically shows operation of the basic training section establishment system 23.

The basic training section establishment system 23 includes a representative user determination section 23A, a representative musical piece determination section 23B, a core model training section 23C, a first basic-training-section-establishing incremental training section 23D, and a second basic-training-section-establishing incremental training section 23E. The representative user determination section 23A determines a plurality of representative users by performing clustering on a plurality of users (user group U) on the basis of a plurality of rating vectors calculated on the basis of a plurality of rating histories provided by the plurality of users acquired from the rating history storage section 3. The representative user determination section 23A calculates a plurality of rating vectors for the plurality of representative users. The representative musical piece determination section 23B determines a plurality of representative musical pieces by performing clustering on a plurality of musical pieces (musical piece group M) on the basis of a plurality of content vectors indicating the acoustic features of the plurality of musical pieces acquired from the acoustic feature storage section 5. The representative musical piece determination section 23B calculates a plurality of content vectors for the plurality of representative musical pieces.

The core model training section 23C includes a probabilistic model for estimation obtained by formulating the three-way aspect model as a core model 23F. The core model training section 23C estimates the topic selection probability, the musical piece selection probability, and the feature occurrence probability of the core model 23F on the basis of the plurality of rating vectors for the plurality of representative users and the plurality of content vectors for the plurality of representative musical pieces to maximize a likelihood of the topic selection probability, the musical piece selection probability, and the feature occurrence probability of the core model 23F.

The first basic-training-section-establishing incremental training section 23D receives the plurality of rating histories for each of the plurality of users stored in the rating history storage section as inputs. The first basic-training-section-establishing incremental training section 23D sequentially adds the topic selection probabilities for each of the plurality of users to the core model 23F such that the likelihood determined previously by the core model training section 23C on the basis of the representative users and the representative musical pieces is kept maximized in order to add the plurality of users to the core model 23F. The second basic-training-section-establishing incremental training section 23E receives the plurality of acoustic features for each of the plurality of musical pieces stored in the acoustic feature storage section 5 as inputs. The second basic-training-section-establishing incremental training section 23E sequentially adds the musical piece selection probabilities for each of the plurality of musical pieces such that the likelihood determined previously by the core model training section 23C on the basis of the representative users and the representative musical pieces is kept maximized in order to add the plurality of musical pieces to the core model 23F. Finally, the basic training section 17 is established as a model obtained as a result of addition of the plurality of topic selection probabilities for the plurality of users and the plurality of musical piece selection probabilities for the plurality of musical pieces to the core model 23F of the core model training section 23C performed by the first and second basic-training-section-establishing incremental training sections 23D and 23E. With this configuration, it is only necessary to perform computation for estimation (training) on the topic selection probabilities for a plurality of users and for estimation (training) on the musical piece selection probabilities for a plurality of musical pieces in order to establish the basic training section 17. Therefore, the computation process can be easily performed even for data on the scale of millions of musical pieces and hundreds of thousands of users. In the system, in order to improve the scalability, specified numbers of representative users and representative musical pieces are virtually generated from large numbers of users and musical pieces, and a compact core model 23F is constructed for the generated representative users and representative musical pieces. Then, the core model 23F is partially updated while successively registering the rating histories provided by each user in the user group U and the acoustic features of each musical piece in the musical piece group M.

That is, the actual user group U and musical piece group M are considered as new users and new musical pieces, and are additionally registered in the core model 23F using the incremental training method. There are two orders for the additional registration. Among them, a scheme in which the musical pieces in the musical piece group M are first additionally registered (corresponding to the lower path in FIG. 12) provides a higher recommendation accuracy. This has been verified in experiments to be described later.

In order to generate the representative users and the representative musical pieces, a clustering method such as the K-means method may be utilized. In the clustering, first, the user group U is classified into groups in accordance with the similarity of the rating vectors based on the rating histories provided by the users. As the distance measure, the Pearson correlation coefficient which is a typical measure in collaborative filtering is used. On the other hand, the musical piece group M is classified into groups in accordance with the Euclidean distance between the feature vectors. The representative users and the representative musical pieces are average users and average musical pieces in each group. An issue here is how to generate a rating matrix R' and a content matrix C' for use in core model training.

FIG. 13 shows an example of calculation of the rating matrix R'. A score given to a certain representative musical piece by a certain representative user is the average value of the actual scores given to musical pieces in the corresponding group by users in the corresponding group. The new content matrix C' is obtained by averaging the feature vectors of musical pieces in each group. Normally, the recommendation accuracy is reduced by performing an approximating operation such as clustering. That is, there is a trade-off between the accuracy and the efficiency (the accuracy and the efficiency are incompatible with each other). In the embodiment, however, there is no such trade-off between the accuracy and the efficiency.

By establishing the basic training section 17 using the basic training section establishment system 23 as described above, the scalability may be enhanced as desired even for data on the scale of millions of musical pieces and hundreds of thousands of users. After the basic training section 17 is established using the basic training section establishment system 23, the established basic training section 17 is used in the musical piece recommendation system 1. Then, the first and second incremental training sections 19 and 21 discussed above are used to further add users and musical pieces to the probabilistic model 13.

Figure 14:
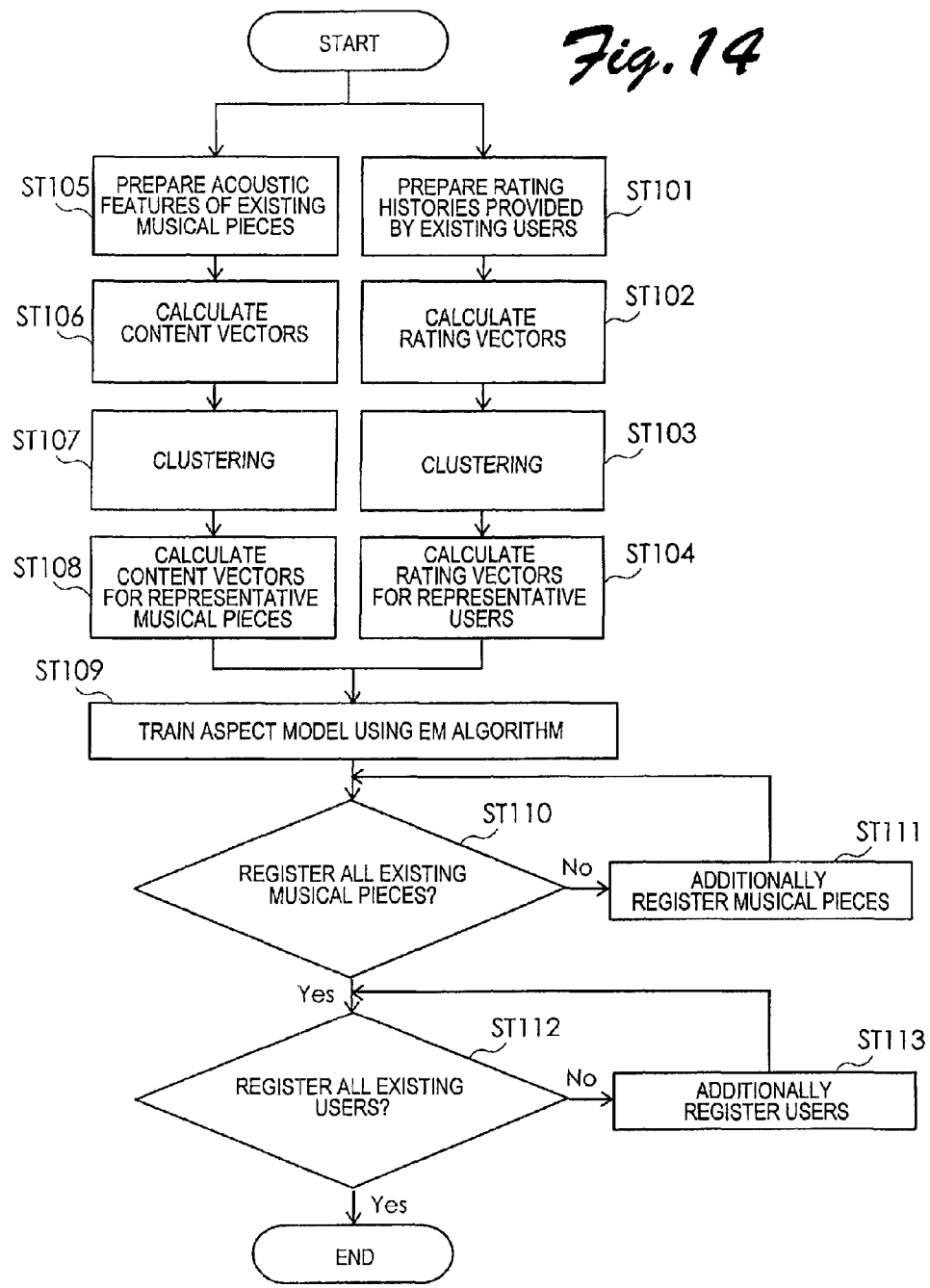
FIG. 14 is a flowchart showing an exemplary algorithm of a program for implementing the basic training section establishment system on a computer through a program.

FIG. 14 shows an exemplary algorithm of a program for implementing the basic training section establishment system 23 on a computer through a computer program. In the algorithm, in step ST101, rating histories provided by existing users are prepared. Then, in step ST102, rating vectors are calculated on the basis of each of the rating histories. Then, in step ST103, clustering is performed to determine a plurality of representative users. In step ST104, rating vectors for the plurality of representative users are calculated. Meanwhile, in step ST105, the acoustic features of existing musical pieces are prepared. Then, in step ST106, content vectors for each of the musical pieces are calculated on the basis of each of the acoustic features. Then, in step ST107, clustering is performed to determine a plurality of representative musical pieces. In step ST108, content vectors for the plurality of representative musical pieces are calculated. In step ST109, the aspect model as another probabilistic model is trained using the EM algorithm on the basis of the plurality of rating vectors for the plurality of representative users calculated in step ST104 and the plurality of content vectors for the plurality of representative musical pieces calculated in step ST108 to determine a plurality of parameters in the aspect model to establish a core model. Next, in order to register information on all the existing musical pieces in the core model, using steps ST110 and ST111, the musical piece selection probabilities for the existing musical pieces are estimated to register all the musical piece selection probabilities in the core model. Thereafter, in order to register information on the existing users in the core model, using steps ST112 and ST113, the topic selection probabilities for the existing users are estimated to register all the topic selection probabilities in the core model. The process is terminated when all the registration is completed. The core model obtained by adding the information in this way is used as the basic training section used in the musical piece recommendation system 1.

The recommendation accuracy may be reduced when the number of users to be added and the number of musical pieces to be added are too large. In such a case, the musical piece recommendation system may further include a recommendation accuracy determination section 25 (FIG. 1) that determines whether or not a reduction in accuracy of recommendation performed by the musical piece recommendation section 15 is larger than a predetermined allowable value. When the recommendation accuracy determination section 25 determines that the reduction in the recommendation accuracy is larger than the predetermined allowable value, the basic training section establishment system 23 is operated again to update the basic training section 17. With this configuration, the basic training section 17 estimates (updates) the parameters in the core model 23F as another probabilistic model again on the basis of all the user rating data and all the musical piece data collected so far, which allows the reduced recommendation accuracy to recover.

Figure 15:
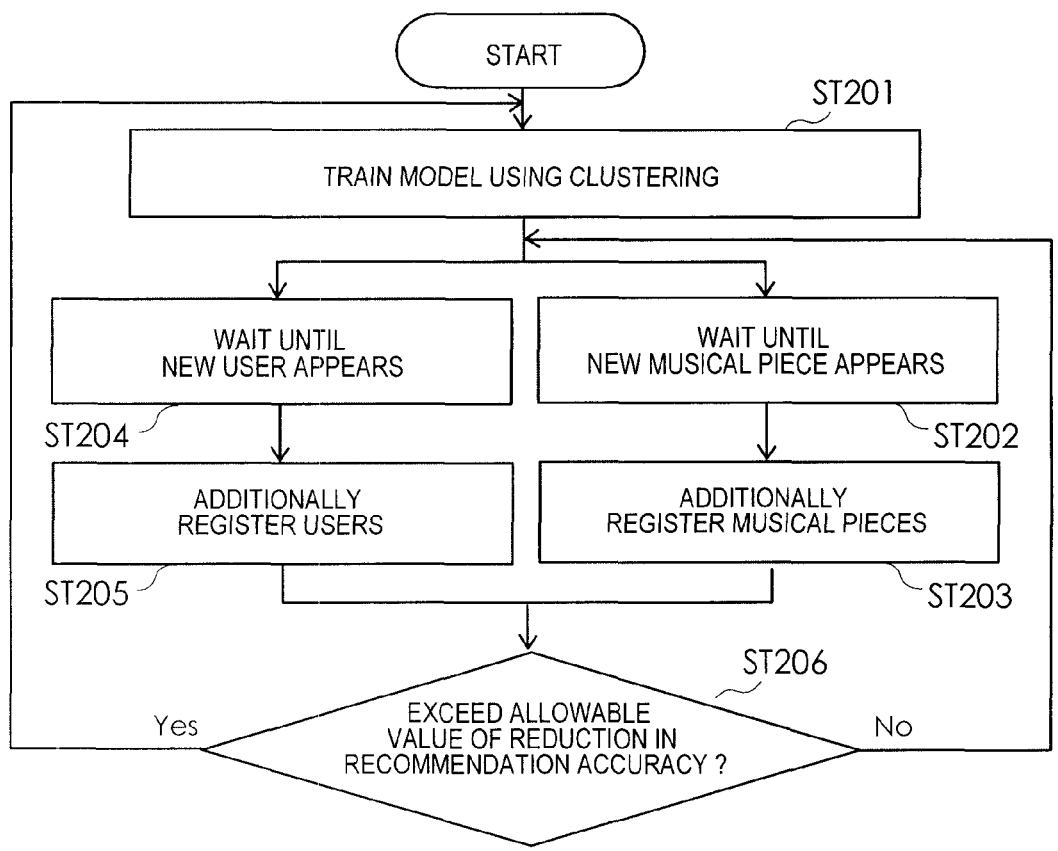
FIG. 15 is a flowchart showing an algorithm of a program used to implement the basic training section establishment system, a recommendation accuracy determination section, and the musical piece recommendation system on a computer through a program.

FIG. 15 shows an algorithm of a program used to implement the basic training section establishment system 23, the recommendation accuracy determination section 25, and the musical piece recommendation system 1 on a computer through a program. After the basic training section 17 is established in step ST201, the process proceeds to steps ST202 and ST 203, and steps ST204 and ST205 to implement the musical piece recommendation system 1. In steps ST204 and ST205, additional registration of a new user (rating histories provided by a new user) is performed. In steps ST202 and ST203, additional registration of a new musical piece (the acoustic features of a new musical piece) is performed. In step ST206, the recommendation accuracy is determined. If the reduction in recommendation accuracy has not exceeded the predetermined allowable value (the reduction in recommendation accuracy is not more than the allowable value), the operation of the musical piece recommendation system 1 is continued. If it is determined in step ST206 that the reduction recommendation accuracy has exceeded the predetermined allowable value (the reduction in recommendation accuracy is more than the allowable value), the process returns to step ST201 to establish the basic training section again.

Now, experiments for evaluating the embodiment will be described. In the above embodiment, by utilizing the incremental training method, the efficiency and scalability of the musical piece recommendation system are significantly improved. However, it is necessary to experimentally verify how the recommendation accuracy is affected. Thus, experiments were conducted under the following experimental conditions.

[Experimental Conditions]

In order to conduct experiments with high reliability, it is desirable to use musical piece rating data in which each user gives ratings to a certain number of musical pieces. To address this issue, rating histories were collected from a website. The musical piece rating data used were the same as the data utilized in a research paper "Hybrid Collaborative and Content-based Music Recommendation Using Probabilistic Model with Latent User Preferences" presented by K. Yoshii, M. Goto, K. Komatani, T. Ogata, and H. G. Okuno in ISMIR, 2006, pp. 296-301. The musical pieces used were Japanese songs on single CDs that were ranked in the weekly top-20 sales rankings from April 2000 to December 2005. The rating histories given to the musical pieces were collected from Amazon.co.jp. Because the rating histories were given user IDs, ratings provided to a plurality of musical pieces by a certain user could be determined as being provided by an identical user. Thereafter, users and musical pieces with less than four ratings were repeatedly removed to extract users and musical pieces with four or more ratings. Finally, the number of users |U| was 316, and the number of musical pieces |M| was 358. The percentages of scores 4 to 0 in all the rating scores or rating histories in the rating matrix R were respectively 57.9%, 19.1%, 8.6%, 4.9%, and 9.5%, which indicated that more than half the rating scores or rating histories were score 4 "most favorite".

[Evaluation Measure]

The experiments were conducted with 10-fold cross validation. First, as shown in FIG. 16, 10% of the rating elements in the rating matrix R were randomly masked to generate a training matrix $R_t$ and an evaluation matrix $R_e$. The recommendation accuracy was evaluated with a focus on a total of x×NU musical pieces for all the users in the case where x (x=1, 3, 10) musical pieces were to be recommended to each user. In FIG. 16, the hatched boxes are the masked scores (rating elements). At this time, a high recommendation accuracy means that the recommended musical pieces include a high percentage of musical pieces that are "actually" given high rating scores or rating histories (3 or 4) and few musical pieces with low rating scores or rating histories (0 or 1). Because there were only a few rating elements in the evaluation matrix $R_e$ (10% of the rating elements in the rating matrix R, which results in a density of the evaluation matrix $R_e$ of 0.219%, however, actually given rating histories could not be referenced for all the recommended x×NU musical pieces. Thus, only musical pieces that were actually given rating histories were extracted from the x×NU musical pieces to calculate the percentage of musical pieces that were given high rating histories in the extracted musical pieces. The number of the extracted musical pieces is defined as N (N<x×NU).

A specific calculation method will be discussed below. Now, $N_r$ is defined as the number of elements whose scores were masked in the training matrix $R_t$ but which were actually given scores r in the evaluation matrix $R_e$. Here, N is defined as $N=\Sigma_r N_r$, and the ratio of $N_r$ to N is defined as "$A_r=N_r/N$". FIG. 17 shows an example of calculation in the case of x=3. In FIG. 17, the hatched boxes are the masked scores, which were considered as φ to perform model training. The numeral in each box in Top-3 rankings shown in the lower part of FIG. 17 indicates the number of the musical piece. The numeral in parenthesis is the actual score. It should be noted that even in the case where random musical pieces are recommended, $A_4, \ldots, A_0$, which are obtained by $A_r=N_r/N$, will not become 20% each. The chance rates for $A_4, \ldots, A_0$ are equal to the percentage of the number of musical pieces with each rating history to the number of rating elements in the rating matrix R, and are respectively 57.9%, 19.1%, 8.6%, 4.9%, and 9.5%. The following discussion is focused on the percentage $A_4$ with which musical pieces with score 4 are to be recommended. A higher value for $A_4$ indicates a higher recommendation accuracy.

[Evaluation of Incremental Training Method]

In order to evaluate the incremental training method, experiments were conducted for each of the three cases discussed earlier in Cases (1) to (3).

[Recommendations to Existing Users]

In the experiments, it was examined how the recommendation accuracy reduced in accordance with a reduction in percentage of rating histories that were used to construct the base probabilistic model. In addition, the difference in recommendation accuracy between the base probabilistic model and the updated probabilistic model was examined. First, the experimental procedures are described. One base model and ten updated models were constructed using a training matrix $R_t$. The base model was obtained by using the training matrix $R_t$ as it is as training data and applying a normal training method using the DAEM algorithm. The updated probabilistic models were obtained in accordance with the following procedures:

(1) A temporary training matrix $R'_t$ was generated by randomly masking K % (K=0, 10, 20, ..., 90) of the rating histories in the training matrix $R_t$. Unless otherwise noted, the simple use of the term "rating scores or rating histories" refers to scores (0 to 4) actually given by the users other than φ.

(2) A temporary base model was obtained by using R'$_t$ as training data and applying a normal training method using the DAEM algorithm.

(3) An updated model was obtained by incrementally adding the masked K % rating histories, that is, by using the training matrix R$_t$.

A total of eleven different models were obtained in this way. The numbers of rating histories utilized to construct each model were finally equal to each other. However, the ratios between the base model training and the incremental training were different from each other. In order to evaluate the recommendation accuracy of each model, an evaluation matrix R$_e$ was utilized. The experimental procedures discussed above were repeated 10 times. This is because ten training matrices R$_t$ were created in the 10-fold cross validation discussed earlier.

Figure 18:
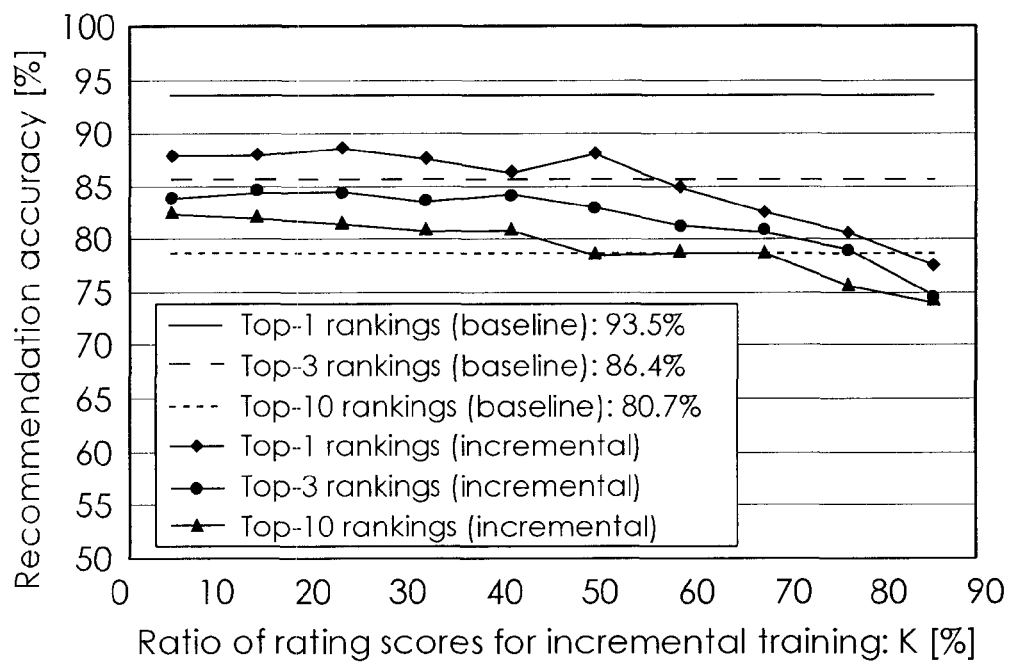
FIG. 18 shows the results of experiments for verifying how the recommendation accuracy reduces along with an increase in ratio of rating histories utilized in incremental training.

FIG. 18 shows the experimental results. In FIG. 18, the vertical axis represents the recommendation accuracy, and the horizontal axis represents the ratio of rating histories for incremental training. Then, Top-1 rankings (baseline) represent a recommendation accuracy of 93.5% achieved in the case where one musical piece is recommended to each user using a probabilistic model obtained by applying the basic training section to the training matrix R$_t$. Top-3 rankings (baseline) represent a recommendation accuracy of 86.4% achieved in the case where three musical pieces are recommended to each user using the probabilistic model. Top-10 rankings (baseline) represent a recommendation accuracy of 80.7% achieved in the case where ten musical pieces are recommended to each user using the probabilistic model.

Also, Top-1 rankings (incremental) represent a recommendation accuracy achieved in the case where one musical piece is recommended to each user using an updated probabilistic model. Top-3 rankings (incremental) represents a recommendation accuracy achieved in the case where three musical pieces are recommended to each user using an updated probabilistic model. Top-10 rankings (incremental) represent a recommendation accuracy achieved in the case where ten musical pieces are recommended to each user using an updated probabilistic model. From the results, it was found that the recommendation accuracy did not reduce very much in the case where a probabilistic model updated using the incremental training method was used.

Also, the incremental training method appropriately adapted the recommendation results to the preference of the users even if rating histories were added. It was found that the recommendation accuracy hardly reduced even if the number of rating histories to be successively added to the base model was increased to the number of rating histories utilized for the base model training (K was increased to 50). Examining the case where only the top-ranked musical piece was recommended to each user (x=1), the difference in recommendation accuracy between the base probabilistic model and the updated probabilistic model was 5%, which maintained a sufficiently high recommendation accuracy.

[Recommendations to New Users]

The experiment compared recommendations to existing users and recommendations to new users in terms of recommendation accuracy. Smaller differences indicate better recommendations.

First, the experimental procedures are described below.

(1) 10% of users were randomly extracted from the user group U and defined as U$_{new}$, and regarded as new users. On the other hand, the remaining users were defined as U$_{reg}$, and regarded as existing users.

(2) A reduced training matrix R'$_t$ was generated by removing the row corresponding to U$_{new}$ from the training matrix R$_t$. That is, the size of R'$_t$ was 90% of the size of R$_t$.

(3) A temporary base model was constructed by using R'$_t$ as training data. The base model did not include user profiles of U$_{new}$.

(4) First, the recommendation accuracy for the existing users U$_{reg}$ was calculated in accordance with the following procedures:
 (a) User profiles of U$_{reg}$ were updated by introducing R'$_t$ into the formula (22) (R'$_t$ was utilized again) to obtain an updated model.
 (b) The recommendation accuracy based on the updated model was calculated using the rows corresponding to U$_{reg}$ in the evaluation matrix R$_e$.

Next, the recommendation accuracy for the new users U$_{new}$ was calculated in accordance with the following procedures:
 (a) User profiles of U$_{new}$ were generated by introducing the rating data removed in the procedure (2) into the formula (22) to obtain an updated model.
 (b) The recommendation accuracy based on the updated model was calculated using the rows corresponding to U$_{new}$ in the evaluation matrix R$_e$.

Because ten training matrices R$_t$ were generated in the 10-fold cross validation, the above procedures (1) to (4) were performed ten times while switching the training matrices R$_t$. In order to calculate the average and variance in recommendation accuracy, such 10-fold cross validation was performed ten times.

Figure 19:
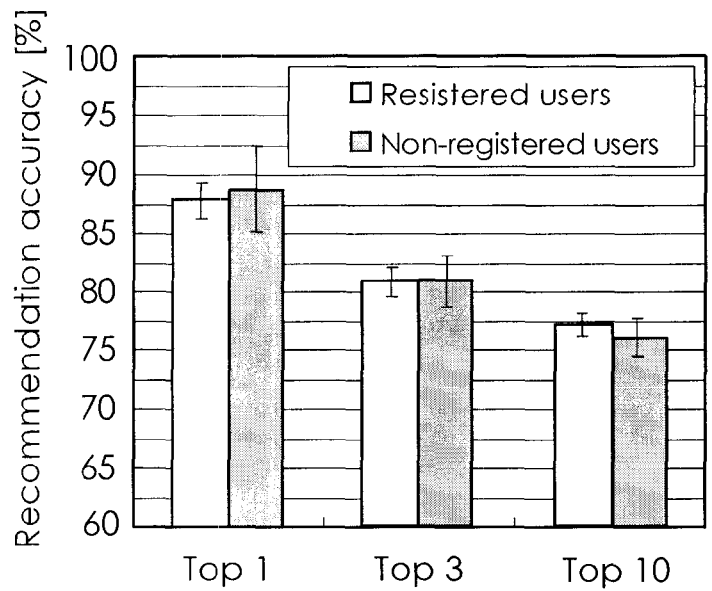
FIG. 19 shows a comparison between the recommendation accuracies for existing or registered users and new or non-registered users.

FIG. 19 shows the experimental results. In FIG. 19, "Registered users" correspond to the existing users, and "Non-registered users" correspond to the new users. The incremental training method made accurate recommendations to the new users as well as to the existing users. F-tests at a significance level of 5% revealed that the variances in accuracy differed between the new users and the existing users. However, Welch's t-tests revealed that there was no difference in the average of recommendation accuracy between the new users and the existing users.

[Recommendations of New Musical Pieces]

The experiment compared recommendations of existing musical pieces and recommendations of new musical pieces in terms of recommendation accuracy. Smaller differences indicate better recommendations.

(1) 10% of musical pieces were randomly extracted from the musical piece group M and defined as M$_{new}$, and regarded as new musical pieces. On the other hand, the remaining musical pieces were defined as M$_{reg}$, and regarded as existing musical pieces.

(2) A reduced training matrix R'$_t$ was generated by removing the columns corresponding to M$_{new}$ from the training matrix R$_t$. That is, the size of the reduced training matrix R'$_t$ was 90% of the size of the training matrix R$_t$.

(3) A temporary base model was constructed by using the reduced training matrix R'$_t$ as training data. The base model did not include the probabilistic relationship between M$_{new}$ and Z.

(4) First, the recommendation accuracy for the existing musical pieces M$_{reg}$ was calculated in accordance with the following procedures:
 (a) The probabilistic relationship between M$_{reg}$ and Z was recalculated by introducing the reduced training matrix R'$_t$ into the formula (23) (R'$_t$ was utilized again) to obtain an updated model.
 (b) The recommendation accuracy based on the updated model was calculated using the columns corresponding to M$_{reg}$ in the evaluation matrix R$_e$.

Next, the recommendation accuracy for the new musical pieces $M_{new}$ was calculated in accordance with the following procedures:
(a) The probabilistic relationship between $M_{new}$ and Z was estimated by introducing the rating data removed in the procedure (2) into the formula (23) to obtain an updated model.
(b) The recommendation accuracy based on the updated model was calculated using the columns corresponding to $M_{new}$ in the evaluation matrix $R_e$.

Because ten training matrices $R_t$ were generated in the 10-fold cross validation, the above procedures (1) to (4) were performed ten times while switching the training matrices $R_t$. In order to calculate the average and variance in recommendation accuracy, such 10-fold cross validation was performed ten times.

Figure 20:
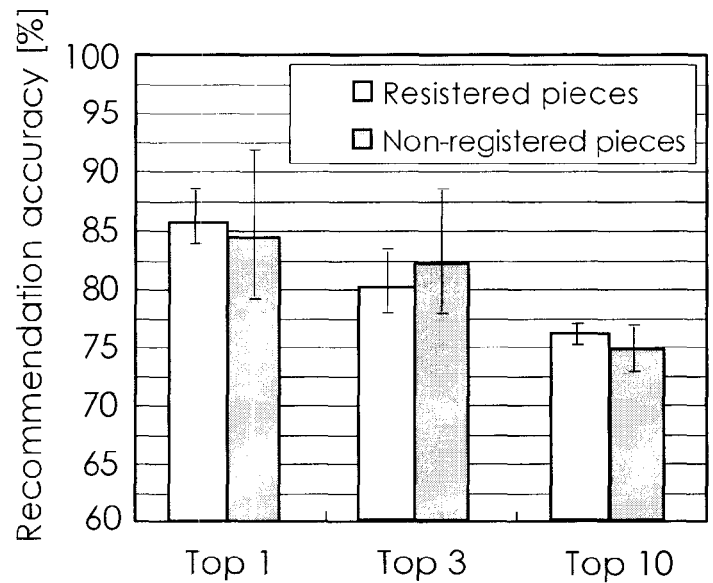
FIG. 20 shows a comparison between the recommendation accuracies for existing or registered musical pieces and new or non-registered musical pieces.

FIG. 20 shows the experimental results. In FIG. 20, "Registered pieces" correspond to the existing musical pieces, and "Non-registered pieces" correspond to the new musical pieces. The incremental training method made accurate recommendations of the new musical pieces as well as of the existing musical pieces. As a result of F-tests at a significance level of 5% and t-tests, the experiment also revealed that there was no difference in average recommendation accuracy between the new musical pieces and the existing musical pieces.

[Evaluation of Scalability Enhancement Method]

The experiment compared the baseline system according to the embodiment of the present invention which used the basic training section according to the related art which did not use the incremental training method discussed earlier and musical piece recommendation systems which used the basic training sections established by two scalable basic training section establishment systems in terms of recommendation accuracy. The two scalable basic training section establishment systems constructed the same core model for virtual users and musical pieces. However, the two systems additionally registered the actual users and musical pieces in different orders. The system, which first adds the musical piece group M and then the user group U, is called a pieces-users system (corresponding to the lower path in FIG. 12), and the system, which first adds the user group U and then the musical piece group M, is called a users-pieces system (corresponding to the upper path in FIG. 12).

Figure 21:
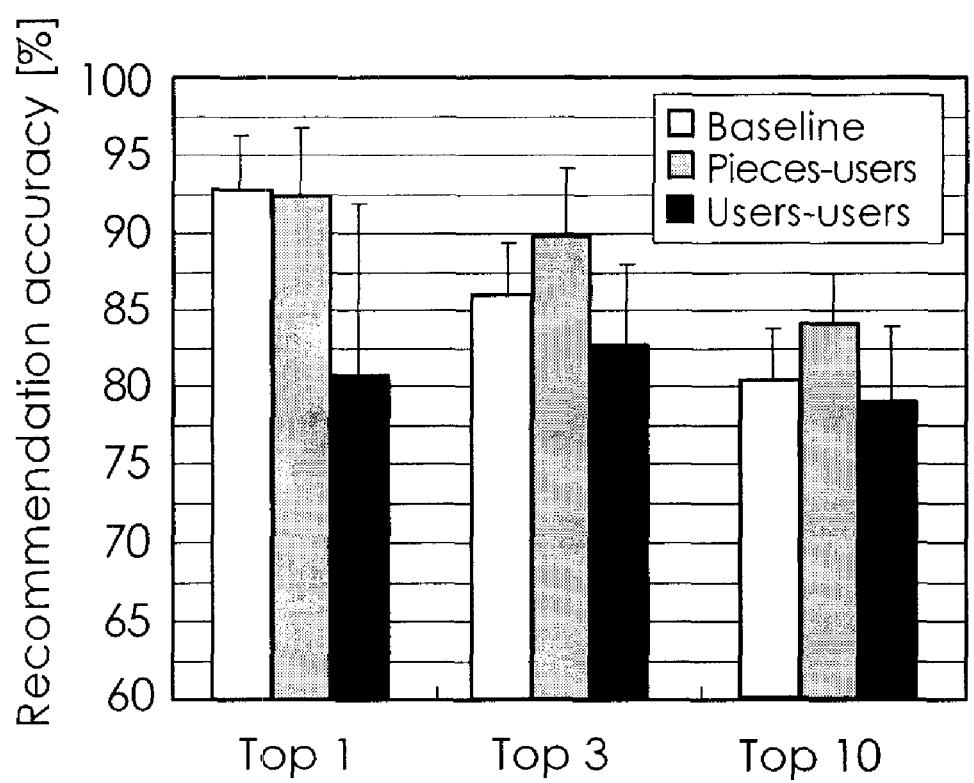
FIG. 21 shows variations in recommendation accuracy in the case where the scalability is improved.

FIG. 21 shows the experimental results. The pieces-users system exhibited a higher recommendation accuracy than the other two systems. In the case where only the top-ranked musical piece is recommended to each user (x=1), the pieces-users system exhibited a recommendation accuracy equivalent to that of the baseline system. In the case where three or ten top-ranked musical pieces are recommended to each user (x=3, 10), the pieces-users system exhibited a significantly high recommendation accuracy. This is because clustering the user group U and the musical piece group M reduced the size and sparseness of the rating matrix (see FIG. 15), which improved the quality of the model parameters estimated using the DAEM algorithm. Even if the DAEM algorithm, which can advantageously avoid falling into a local solution compared to the ordinary EM algorithm, was utilized, the original rating matrix R was extremely sparse and tended to easily fall into a local solution, and therefore the scalability improvement method which reduced the sparseness was effective.

In contrast, the users-pieces system exhibited a recommendation accuracy lower than that of the baseline system. The formula (22) for generating user profiles of the actual user group U includes summation related to the musical piece group M. Therefore, it is desirable to utilize the content matrix of the actual musical piece group M, rather than the content matrix of the virtual musical piece group. On the other hand, the formula (23) does not include summation related to the user group U. Therefore, it is necessary to additionally register the actual musical pieces before additionally registering the actual users.

According to the embodiment, the parameters in the probabilistic model may be partially updated to efficiently additionally register users and musical pieces in the system. Further, the scalability may be improved by combining the incremental training method with a clustering method. As a result, according to the embodiment, not only training of the probabilistic model may be dramatically sped up, but also the recommendation accuracy can be improved. That is, the trade-off between the recommendation accuracy and the efficiency and scalability can be overcome.

It is a matter of course that the programs used in the embodiment may be stored in a computer-readable storage medium.

What is claimed is:

1. A musical piece recommendation system including at least one processor, the at least one processor comprising:
a rating history storage section that stores a plurality of rating histories obtained as a result of rating of at least one of a plurality of musical pieces performed by each of a plurality of users;
an acoustic feature storage section that stores acoustic features extracted from audio signals of the plurality of musical pieces;
a musical piece recommendation section that includes a probabilistic model including a plurality of variables and a plurality of parameters and that outputs a preference ranking of the plurality of musical pieces in response to a musical piece recommendation request from one of the users; and
a basic training section that receives the plurality of rating histories and the plurality of acoustic features as inputs and that estimates the plurality of parameters in the probabilistic model to maximize a likelihood of the plurality of parameters,
wherein the probabilistic model included in the musical piece recommendation section includes a musical piece variable node that stores variables related to the plurality of musical pieces, a user variable node that stores variables related to the plurality of users, a feature variable node that stores variables related to the plurality of acoustic features, and a latent variable node that stores a plurality of conceptual topics as latent variables,
a plurality of topic selection probabilities are defined between the user variable node and the latent variable node, each of the topic selection probabilities corresponding to a probability with which when one of the users is selected, the user selects each of the plurality of topics,
a plurality of musical piece selection probabilities are defined between the latent variable node and the musical piece variable node, each of the musical piece selection probabilities corresponding to a probability with which when one of the topics is selected, each of the plurality of musical pieces is selected,
a plurality of feature occurrence probabilities are defined between the latent variable node and the feature variable node, each of the feature occurrence probabilities corresponding to a probability with which when one of the topics is selected, each of the variables related to the plurality of acoustic features occurs for the topic, the probabilistic model is obtained by formulating a three-way aspect model in which the topic selection probability, the musical piece selection probability, and the feature occurrence probability are independent of each other, the formulated three-way aspect model includes the topic selection probability, the musical piece selection probability, and the feature occurrence probability as the plurality of parameters in a formula for calculating a generation probability of an event in which a certain user listens to a certain acoustic feature in a certain musical piece, the musical piece recommendation section is configured to output, in response to a musical piece recommendation request from one of the users, a preference ranking of the plurality of musical pieces for the user using the topic selection probability for the user, the musical piece selection probability, and the feature occurrence probability, the musical piece recommendation system further comprises:

a first incremental training section that monitors the rating history storage section and that each time a change is made to the rating history or a new user is added, performs updating of or addition of the topic selection probability for the user for which the change is made to the rating history or for the new user such that the likelihood determined by the basic training section is kept maximized; and a second incremental training section that monitors the acoustic feature storage section and that each time a new musical piece is added to perform addition to the acoustic features, performs addition to the musical piece selection probability related to the added musical piece such that the likelihood determined by the basic training section is kept maximized; and the basic training section comprises:
   a rating vector calculation section that calculates a plurality of rating vectors from the plurality of rating histories;
   a content vector calculation section that calculates a plurality of content vectors from the plurality of acoustic features;
   a likelihood calculation section that calculates the likelihood of the parameters for the plurality of rating vectors and the plurality of content vectors;
   an updating section that updates the plurality of topic selection probabilities, the plurality of musical piece selection probabilities, and the plurality of feature occurrence probabilities to maximize the likelihood; and
   a convergence determination section that terminates operation of the likelihood calculation section and the updating section upon determining that an increase in the likelihood has converged.

2. The musical piece recommendation system according to claim 1, the at least one processor further comprising:

a basic training section establishment system that establishes the basic training section, the basic training section establishment system comprising:
   a representative user determination section that determines a plurality of representative users by performing clustering on the plurality of users on the basis of a plurality of rating vectors calculated on the basis of the plurality of rating histories and that calculates a plurality of rating vectors for the plurality of representative users;
   a representative musical piece determination section that determines a plurality of representative musical pieces by performing clustering on the plurality of musical pieces on the basis of a plurality of content vectors indicating the acoustic features of the plurality of musical pieces and that calculates a plurality of content vectors for the plurality of representative musical pieces;
   a core model training section that includes a probabilistic model for estimation obtained by formulating the three-way aspect model as a core model and that estimates the topic selection probability, the musical piece selection probability, and the feature occurrence probability of the core model on the basis of the plurality of rating vectors for the plurality of representative users and the plurality of content vectors for the plurality of representative musical pieces to maximize a likelihood of the topic selection probability, the musical piece selection probability, and the feature occurrence probability of the core model;
   a first basic-training-section-establishing incremental training section that receives the plurality of rating histories for each of the plurality of users stored in the rating history storage section as inputs and that sequentially adds the topic selection probabilities for the plurality of users to the core model such that the likelihood determined by the core model training section is kept maximized in order to add the plurality of users to the core model; and
   a second basic-training-section-establishing incremental training section that receives the plurality of acoustic features for each of the plurality of musical pieces stored in the acoustic feature storage section as inputs and that sequentially adds the musical piece selection probabilities for the plurality of musical pieces to the core model such that the likelihood determined by the core model training section is kept maximized in order to add the plurality of musical pieces to the core model, wherein the basic training section is established as a model obtained as a result of addition of the plurality of topic selection probabilities for the plurality of users and the plurality of musical piece selection probabilities for the plurality of musical pieces to the core model of the core model training section performed by the first and second basic-training-section-establishing incremental training sections.

3. The musical piece recommendation system according to claim 2, wherein the addition to the core model performed by the second basic-training-section-establishing incremental training section of the at least one processor is executed in priority to the addition to the core model performed by the first basic-training-section-establishing incremental training section of the at least one processor.

4. The musical piece recommendation system according to claim 2, the at least one processor further comprising:

a recommendation accuracy determination section that determines whether or not a reduction in accuracy of recommendation performed by the musical piece recommendation section is larger than a predetermined allowable value, wherein the basic training section establishment system of the at least one processor is operated again to update the basic training section of the at least one processor when the recommendation accuracy determination section of the at least one processor determines that the reduction in the recommendation accuracy is larger than the predetermined allowable value.

5. A basic training section establishment method for establishing the basic training section according to claim 1 using a computer, the method comprising the steps of:
determining a plurality of representative users by performing clustering on the plurality of users on the basis of a plurality of rating vectors calculated on the basis of the plurality of rating histories and calculating a plurality of rating vectors for the plurality of representative users, as a representative user determination step with a user determination section of the at least one processor;
determining a plurality of representative musical pieces by performing clustering on the plurality of musical pieces on the basis of a plurality of content vectors indicating the acoustic features of the plurality of musical pieces and calculating a plurality of content vectors for the plurality of representative musical pieces, as a representative musical piece determination step with a musical piece determination section of the at least one processor;
preparing a core model training section of the at lest one processor that includes a probabilistic model for estimation obtained by formulating the three-way aspect model as a core model and that estimates the topic selection probability, the musical piece selection probability, and the feature occurrence probability of the core model on the basis of the plurality of rating vectors for the plurality of representative users and the plurality of content vectors for the plurality of representative musical pieces to maximize a likelihood of the topic selection probability, the musical piece selection probability, and the feature occurrence probability of the core model;
receiving the plurality of rating histories for each of the plurality of users stored in the rating history storage section of the at least one processor as inputs and sequentially adding the topic selection probabilities for the plurality of users to the core model such that the likelihood determined by the core model training section of the at least one processor is kept maximized in order to add the plurality of users to the core model, as a first basic-training-section-establishing incremental training step with a first basic-training-section-establishing incremental training section of the at least one processor; and
receiving the plurality of acoustic features for each of the plurality of musical pieces stored in the acoustic feature storage section of the at least one processor as inputs and sequentially adding the musical piece selection probabilities for the plurality of musical pieces to the core model such that the likelihood determined by the core model training section of the at least one processor is kept maximized in order to add the plurality of musical pieces to the core model, as a second basic-training-section-establishing incremental training step with a second basic-training-section-establishing incremental training section of the at least one processor,
wherein the basic training section of the at least one processor is established as a model obtained as a result of addition of the plurality of topic selection probabilities for the plurality of users and the plurality of musical piece selection probabilities for the plurality of musical pieces to the core model performed in the first and second basic-training-section-establishing incremental training steps of the first and second basic-training-section-establishing incremental training section of the at least one processor.

6. The basic training section establishment method according to claim 5,
wherein the second basic-training-section-establishing incremental training step is executed in priority to the first basic-training-section-establishing incremental training step.

7. A computer-readable non-transitory recording medium recorded with a computer program for basic training section establishment, the program installed in a computer causing the computer to implement the basic training section according to claim 5, the computer program causing the computer to implement:
a representative user determination function of determining a plurality of representative users by performing clustering on the plurality of users on the basis of a plurality of rating vectors calculated on the basis of the plurality of rating histories and calculating a plurality of rating vectors for the plurality of representative users;
a representative musical piece determination function of determining a plurality of representative musical pieces by performing clustering on the plurality of musical pieces on the basis of a plurality of content vectors indicating the acoustic features of the plurality of musical pieces and calculating a plurality of content vectors for the plurality of representative musical pieces;
a function of preparing a core model training section that includes a probabilistic model for estimation obtained by formulating the three-way aspect model as a core model and that estimates the topic selection probability, the musical piece selection probability, and the feature occurrence probability of the core model on the basis of the plurality of rating vectors for the plurality of representative users and the plurality of content vectors for the plurality of representative musical pieces to maximize a likelihood of the topic selection probability, the musical piece selection probability, and the feature occurrence probability of the core model;
a first basic-training-section-establishing incremental training function of receiving the plurality of rating histories for each of the plurality of users stored in the rating history storage section as inputs and sequentially adding the topic selection probabilities for the plurality of users to the core model such that the likelihood determined by the core model training section is kept maximized in order to add the plurality of users to the core model; and
a second basic-training-section-establishing incremental training function of receiving the plurality of acoustic features for each of the plurality of musical pieces stored in the acoustic feature storage section as inputs and sequentially adding the musical piece selection probabilities for the plurality of musical pieces to the core model such that the likelihood determined by the core model training section is kept maximized in order to add the plurality of musical pieces to the core model,
wherein the basic training section is established as a model obtained as a result of addition of the plurality of topic selection probabilities for the plurality of users and the plurality of musical piece selection probabilities for the plurality of musical pieces to the core model of the core model training section performed by the first and second basic-training-section-establishing incremental training functions.

8. A computer-readable non-transitory recording medium recorded with a computer program for basic training section establishment, the program installed in a computer causing the computer to implement the basic training section according to claim 1, the computer program causing the computer to implement:
- a representative user determination function of determining a plurality of representative users by performing clustering on the plurality of users on the basis of a plurality of rating vectors calculated on the basis of the plurality of rating histories and calculating a plurality of rating vectors for the plurality of representative users;
- a representative musical piece determination function of determining a plurality of representative musical pieces by performing clustering on the plurality of musical pieces on the basis of a plurality of content vectors indicating the acoustic features of the plurality of musical pieces and calculating a plurality of content vectors for the plurality of representative musical pieces;
- a function of preparing a core model training section that includes a probabilistic model for estimation obtained by formulating the three-way aspect model as a core model and that estimates the topic selection probability, the musical piece selection probability, and the feature occurrence probability of the core model on the basis of the plurality of rating vectors for the plurality of representative users and the plurality of content vectors for the plurality of representative musical pieces to maximize a likelihood of the topic selection probability, the musical piece selection probability, and the feature occurrence probability of the core model;
- a first basic-training-section-establishing incremental training function of receiving the plurality of rating histories for each of the plurality of users stored in the rating history storage section as inputs and sequentially adding the topic selection probabilities for the plurality of users to the core model such that the likelihood determined by the core model training section is kept maximized in order to add the plurality of users to the core model; and
- a second basic-training-section-establishing incremental training function of receiving the plurality of acoustic features for each of the plurality of musical pieces stored in the acoustic feature storage section as inputs and sequentially adding the musical piece selection probabilities for the plurality of musical pieces to the core model such that the likelihood determined by the core model training section is kept maximized in order to add the plurality of musical pieces to the core model,
- wherein the basic training section is established as a model obtained as a result of addition of the plurality of topic selection probabilities for the plurality of users and the plurality of musical piece selection probabilities for the plurality of musical pieces to the core model of the core model training section performed by the first and second basic-training-section-establishing incremental training functions.

9. A musical piece recommendation method for causing a computer that includes at least one processor to perform the steps of:
- storing in a rating history storage section of the at least one processor a plurality of rating histories obtained as a result of rating of at least one of a plurality of musical pieces performed by each of a plurality of users;
- extracting a plurality of acoustic features from audio signals of the plurality of musical pieces and storing in an acoustic feature storage section of the at least one processor the plurality of acoustic features extracted from the plurality of musical pieces;
- outputting, in response to a musical piece recommendation request from one of the users, a preference ranking of the plurality of musical pieces using a probabilistic model, as a musical piece recommendation step, wherein the probabilistic model includes a musical piece variable node that stores variables related to the plurality of musical pieces, a user variable node that stores variables related to the plurality of users, a feature variable node that stores variables related to the plurality of acoustic features, and a latent variable node that stores a plurality of conceptual topics as latent variables, a plurality of topic selection probabilities are defined between the user variable node and the latent variable node, each of the topic selection probabilities corresponding to a probability with which when one of the users is selected, the user selects each of the plurality of topics, a plurality of musical piece selection probabilities are defined between the latent variable node and the musical piece variable node, each of the musical piece selection probabilities corresponding to a probability with which when one of the topics is selected, each of the plurality of musical pieces is selected, a plurality of feature occurrence probabilities are defined between the latent variable node and the feature variable node, each of the feature occurrence probabilities corresponding to a probability with which when one of the topics is selected, each of the variables related to the plurality of acoustic features occurs for the topic, the probabilistic model is obtained by formulating a three-way aspect model in which the topic selection probability, the musical piece selection probability, and the feature occurrence probability are independent of each other, the formulated three-way aspect model includes the topic selection probability, the musical piece selection probability, and the feature occurrence probability as a plurality of parameters in a formula for calculating a generation probability of an event in which a certain user listens to a certain acoustic feature in a certain musical piece, and the probabilistic model is configured to output, in response to a musical piece recommendation request from one of the users, a preference ranking of the plurality of musical pieces for the user using the topic selection probability for the user, the musical piece selection probability, and the feature occurrence probability;
- receiving the plurality of rating histories and the plurality of acoustic features as inputs and estimating the plurality of parameters in the probabilistic model to maximize a likelihood of the plurality of parameters, as a basic training step, the basic training step being performed before execution of the musical piece recommendation step;
- monitoring the rating history storage section of at least one processor, and each time a change is made to the rating history or a new user is added, performing updating of or addition of the topic selection probability for the user for which the change is made to the rating history or for the new user such that the likelihood determined in the basic training step is kept maximized, as a first incremental training step, the first incremental training step being performed after execution of the basic training step; and
- monitoring the acoustic feature storage section of the at least one processor, and each time a new musical piece is added to perform addition to the acoustic features, performing addition to the musical piece selection probability related to the added musical piece such that the likelihood determined in the basic training step is kept maximized, as a second incremental training step, the second incremental training step being performed after execution of the basic training step, wherein the basic training step comprises the steps of:
  calculating a plurality of rating vectors from the plurality of rating histories;
  calculating a plurality of content vectors from the plurality of acoustic features;
  calculating the likelihood of the parameters for the plurality of rating vectors and the plurality of content vectors, as a likelihood calculation step;
  updating the plurality of topic selection probabilities, the plurality of musical piece selection probabilities, and the plurality of feature occurrence probabilities to maximize the likelihood, as an updating step; and
  terminating the likelihood calculation step and the updating step when it is determined that an increase in the likelihood has converged.

10. A computer-readable non-transitory computer program for musical piece recommendation, the program installed in a computer causing the computer to implement:
  a musical piece recommendation function of outputting, in response to a musical piece recommendation request from one of users, a preference ranking of a plurality of musical pieces using a probabilistic model, wherein the probabilistic model includes a musical piece variable node that stores variables related to the plurality of musical pieces, a user variable node that stores variables related to a plurality of users, a feature variable node that stores variables related to a plurality of acoustic features extracted from each of the plurality of musical pieces, and a latent variable node that stores a plurality of conceptual topics as latent variables, a plurality of topic selection probabilities are defined between the user variable node and the latent variable node, each of the topic selection probabilities corresponding to a probability with which when one of the users is selected, the user selects each of the plurality of topics, a plurality of musical piece selection probabilities are defined between the latent variable node and the musical piece variable node, each of the musical piece selection probabilities corresponding to a probability with which when one of the topics is selected, each of the plurality of musical pieces is selected, a plurality of feature occurrence probabilities are defined between the latent variable node and the feature variable node, each of the feature occurrence probabilities corresponding to a probability with which when one of the topics is selected, each of the variables related to the plurality of acoustic features occurs for the topic, the probabilistic model is obtained by formulating a three-way aspect model in which the topic selection probability, the musical piece selection probability, and the feature occurrence probability are independent of each other, the formulated three-way aspect model includes the topic selection probability, the musical piece selection probability, and the feature occurrence probability as a plurality of parameters in a formula for calculating a generation probability of an event in which a certain user listens to a certain acoustic feature in a certain musical piece, and the probabilistic model is configured to output, in response to a musical piece recommendation request from one of the users, a preference ranking of the plurality of musical pieces for the user using the topic selection probability for the user, the musical piece selection probability, and the feature occurrence probability;
  a basic training function of receiving a plurality of rating histories obtained as a result of rating of at least one of the plurality of musical pieces performed by each of the plurality of users stored in a rating history storage section and the plurality of acoustic features stored in an acoustic feature storage section as inputs and estimating the plurality of parameters in the probabilistic model to maximize a likelihood of the plurality of parameters;
  a first incremental training function of monitoring the rating history storage section, and each time a change is made to the rating history or a new user is added, performing updating of or addition to the topic selection probability for the user for which the change is made to the rating history or for the new user such that the likelihood determined by the basic training function is kept maximized; and
  a second incremental training function of monitoring the acoustic feature storage section, and each time a new musical piece is added to perform addition to the acoustic features, performing addition to the musical piece selection probability related to the added musical piece such that the likelihood determined by the basic training function is kept maximized,
  wherein the basic training function comprises;
    a rating vector calculation function of calculating a plurality of rating vectors from the plurality of rating histories;
    a likelihood calculation function of calculating the likelihood of the parameters for the plurality of rating vectors and a plurality of content vectors indicating the plurality of acoustic features;
    an updating function of updating the plurality of topic selection probabilities, the plurality of musical piece selection probabilities, and the plurality of feature occurrence probabilities to maximize the likelihood; and
    a convergence determination function of terminating the likelihood calculation function and the updating function when it is determined that an increase in the likelihood has converged.

* * * * *